United States Patent
Ito et al.

(10) Patent No.: US 7,215,480 B2
(45) Date of Patent: May 8, 2007

(54) VARIABLE-FOCUS LENS AND IMAGE TAKING APPARATUS

(75) Inventors: Yoshihiro Ito, Asaka (JP); Nobuaki Nago, Asaka (JP); Takashi Kato, Minami-Ashigara (JP); Hitoshi Miyano, Saitama (JP)

(73) Assignees: Fujifilm Corporation, Tokyo (JP); Fujinon Corporation, Saitama (JP)

( * ) Notice: Subject to any disclaimer, the term of this patent is extended or adjusted under 35 U.S.C. 154(b) by 129 days.

(21) Appl. No.: 11/213,741

(22) Filed: Aug. 30, 2005

(65) Prior Publication Data

US 2006/0050402 A1 Mar. 9, 2006

(30) Foreign Application Priority Data

Sep. 7, 2004 (JP) .............................. 2004-259930
Mar. 10, 2005 (JP) .............................. 2005-067040
Aug. 18, 2005 (JP) .............................. 2005-237385

(51) Int. Cl.
*G02B 1/06* (2006.01)
*G02B 3/12* (2006.01)

(52) U.S. Cl. ...................................... 359/666; 359/665
(58) Field of Classification Search ................ 359/665, 359/666, 667
See application file for complete search history.

(56) References Cited

U.S. PATENT DOCUMENTS 7,180,678 B2 * 2/2007 Kato et al. ................... 359/665

2006/0044448 A1 * 3/2006 Kato et al. ................... 348/335
2006/0050412 A1 * 3/2006 Ito et al. ...................... 359/745
2006/0056008 A1 * 3/2006 Ito et al. ...................... 359/296

FOREIGN PATENT DOCUMENTS

JP 2002-341311 A 11/2002

OTHER PUBLICATIONS

Philips Fluid Lenses Bring Things Into Focus, Digital Photography Review, www.dpreview.com, Mar. 3, 2004.

* cited by examiner

Primary Examiner—David N. Spector
(74) Attorney, Agent, or Firm—Sughrue Mion, PLLC

(57) ABSTRACT

The present invention provides a variable-focus lens capable of freely changing the refractive power and operating with a reduced deterioration in performance and an image taking apparatus having a focal-length-variable image taking lens including the variable-focus lens. The variable-focus lens includes: a lens body having an electromagnetic field generator which changes the focal length of the light passage region by moving, by an electromagnetic force, light-transmissive nanoparticles which are dispersed in a light-transmissive dispersion medium enclosed in a container having the shape of a lens, and which have a refractive index different from the refractive index of the dispersion medium; a moving mechanism which moves the lens body in an optical axis direction; and a focal length adjustment section which changes the focal length of the lens body by controlling an electromagnetic field generated by the electromagnetic field generator.

17 Claims, 31 Drawing Sheets

VARIABLE-FOCUS LENS AND IMAGE TAKING APPARATUS

BACKGROUND OF THE INVENTION

1. Field of the Invention

The present invention relates to a variable-focus lens capable of changing the focal length and an image taking apparatus having an image taking lens including the variable-focus lens and capable of changing the focal length.

2. Description of the Related Art

As a variable-focus lens capable of changing the focal length, a liquid crystal lens capable of changing the, focal length by using the electro-optic effect of a liquid crystal is known. For example, Japanese Patent Laid-Open No. 2002-341311 (patent document 1) discloses a liquid crystal lens having first and second light-transmissive substrates in the form of a flat plate, a third light-transmissive substrate having two concave surfaces and provided between the first and second light-transmissive substrates, and a liquid crystal enclosed in each of a space between the first and third light-transmissive substrates and a space between the second and third light-transmissive substrates. In this liquid crystal lens, the orientation of liquid crystal molecules is changed according to the level of an applied voltage to change the refractive index of the liquid crystal lens and to thereby change the focal length of the lens.

A fluid lens which can be changed in shape by application of a voltage to change its focal length is also known as a variable-focus lens. For example, a fluid lens in which an immiscible fluid constituted of a non-electroconductive oil and an electroconductive aqueous solution is enclosed in a tube having its inner wall surface covered with a water-repellent coating is proposed in "Philips' Fluid Lenses", [online], Mar. 03, 2004, Royal Philips Electronics, [found on Mar. 31, 2004], Internet <URL: http://www.dpreview.com/news/0403/04030302philipsfluidle ns.asp> (non-patent document 1). In this fluid lens, when no voltage is applied, the aqueous solution constituting the immiscible fluid is a semispherical mass and the interface of the aqueous solution on the oil is convex. This interface changes between the convex state and a concave state according to the level of the applied voltage. Consequently, the radius of curvature of the lens can be changed and the focal length of the lens is freely variable.

In the technique disclosed in the patent document 1, the focal length of the liquid crystal lens is changed by using the difference $\Delta n$ ($n\psi - n\perp$) between the refractive index ($n\psi$) in the major-axis direction of liquid crystal molecules and the refractive index ($n\perp$) in the minor-axis direction. However, there is a problem that the difference $\Delta n$ is so small that the refractive index of the lens cannot be freely changed.

In the technique proposed in the non-patent document 1, the focal length of the liquid crystal lens is changed by applying a voltage to the immiscible fluid. When a voltage is applied to the immiscible fluid, a current flows through the electroconductive aqueous solution constituting the immiscible fluid. Therefore, there is a risk of the aqueous solution being decomposed by electrolysis to generate hydrogen and oxygen, and there is a problem that during use over a long time period a gas constituted of generated hydrogen and oxygen is accumulated to form bubbles which scatter light and deteriorate the performance of the lens.

SUMMARY OF THE INVENTION

The present invention has been made in view of the above circumstances and provides a variable-focus lens capable of freely changing the refractive power and operating with a reduced deterioration in performance and an image taking apparatus having an image taking lens including the variable-focus lens and capable of changing the focal length.

The present invention provides a variable-focus lens including:

a lens body having a container which is light-transmissive at least in a light passage region, and which has the shape of a lens, a light-transmissive dispersion medium enclosed in the container, a light-transmissive dispersoid dispersed in the dispersion medium and having a refractive index different from the refractive index of the dispersion medium, and an electromagnetic field generator which changes the focal length of the light passage region by moving the dispersoid dispersed in the dispersion medium by an electromagnetic force;

a moving mechanism which moves the lens body in an optical axis direction; and a focal length adjustment section which changes the focal length of the light passage region by controlling an electromagnetic field generated by the electromagnetic field generator.

In the variable-focus lens of the present invention, the dispersoid, which is dispersed in the light-transmissive dispersion medium enclosed in the container provided in the lens body, which is light-transmissive, and which has a refractive index higher than that of the dispersion medium, is moved by electrophoresis to change the focal length of the light passage region in the lens body, and the lens body is moved in the optical axis direction. Thus, the focal-length-variable lens body having the focal length capable of being changed according to a refractive index determined by the dispersion medium and the amount of movement of the dispersoid in the light passage region caused by electrophoresis can be moved in the optical axis direction. Therefore, if the variable-focus lens of the present invention is provided in a digital camera, focusing can be performed as described below. The focal length of the light passage region in the lens body is changed by causing electrophoresis of the dispersoid provided in the lens body constituting the variable-focus lens. The focal length is thereby adjusted between a telephoto end and a wide-angle end to set a desired image-taking field angle. Thereafter (or simultaneously), the lens body is moved frontward or rearward in the optical axis direction for focusing. Thus, one lens body can have both the zooming function and the focusing function. The dispersoid dispersed in the dispersion medium is moved by an electric field or a magnetic field generated by the electromagnetic field generator, and no current is thereby caused. Therefore, the risk of electrolysis is reduced in comparison with the technique using a current flowing through an electroconductive aqueous solution as proposed in the non-patent document 1. Consequently, the deterioration of the performance of the lens can be limited over a long time period.

Preferably, the electromagnetic field generator in the variable-focus lens of the present invention includes an electrode which receives application of a voltage to cause electrophoresis of the dispersoid, and the focal length adjustment section controls the voltage applied to the electrode.

In the electrophoretic variable-focus lens using this electrophoresis, electrophoresis of the dispersoid is caused by the electric field applied from the electrode, thereby controlling the focal length. The amount of the dispersoid moved by electrophoresis can be freely controlled according to the waveform and the pattern of a voltage applied to the electrode, the placement, shape and structure of the electrode, and other factors. Therefore, the refractive index distribution can be obtained with flexibility in comparison with the technique of controlling the refraction of light by using the refractive index of liquid crystal molecules as proposed in the patent document 1.

Preferably, the dispersoid in the electrophoretic variable-focus lens of the present invention is constituted of titanium oxide.

If the dispersoid is constituted of titanium oxide, an optical member having a high refractive index can be realized. Also, titanium oxide is easily available.

It is a preferable aspect that the dispersoid in the electrophoretic variable-focus lens of the present invention is constituted of alumina.

If the dispersoid is constituted of alumina, the cost of the dispersoid is reduced.

It is a preferable aspect that the dispersion medium in the electrophoretic variable-focus lens of the present invention is an organic dispersion medium.

If the dispersion medium is an organic dispersion medium, the dispersion medium is electrically stable.

Preferably, the dispersion medium in the electrophoretic variable-focus lens of the present invention is a hydrocarbon-based organic dispersion medium.

If the dispersion medium is a hydrocarbon-based organic dispersion medium, the electrical stability is further improved in comparison with organic dispersion mediums having functional groups.

Preferably, the electrode in the electrophoretic variable-focus lens of the present invention is coated with an insulating film which is placed adjacent to the dispersion medium.

Agglomeration of the dispersoid on the electrodes can be prevented in this way.

Also, the insulating film in the electrophoretic variable-focus lens of the present invention is preferably a polyimide insulating film.

An electrode having improved heat resistance and durability can be obtained by using a polyimide insulating film.

Preferably, the dispersoid in the electrophoretic variable-focus lens of the present invention is magnetic; the electromagnetic field generator is a magnetic field generator which causes magnetophoresis of the dispersoid; and the focal length adjustment section controls a magnetic field generated by the magnetic field generator.

In the magnetophoretic variable-focus lens using this magnetophoresis, the focal length of the light passage region is controlled by causing magnetophoresis of the magnetic dispersoid in the dispersion medium instead of causing electrophoresis. Control of an electric field is required for electrophoresis of a dispersoid. However, control of a magnetic field easier than control of an electric field suffices for magnetophoresis of the magnetic dispersoid. As a result, the focal length of the variable-focus lens can be adjusted with reliability.

Preferably, the dispersoid in the magnetophoretic variable-focus lens of the present invention is constituted of titanium-cobalt oxide.

Titanium-cobalt oxide can form magnetic particles having high optical transmissivity and can be easily produced.

Preferably, the dispersoid in the variable-focus lens of the present invention is nanoparticles.

Electrophoresis of the dispersoid can be effected even in a case where the dispersoid is nanoparticles.

Preferably, the dispersoid in the variable-focus lens of the present invention is nanoparticles having a particle size of 5 to 100 nm.

If the dispersoid is nanoparticles having a particle size of 5 to 100 nm, scattering of light can be avoided and the desired light transmissivity can be maintained. Also, nanoparticles having a particle size in this range can be easily handled.

Preferably, the dispersion medium in the variable-focus lens of the present invention is water.

If the dispersion medium is water, the dispersibility of the dispersoid is high and the cost of the dispersion medium is reduced.

In the variable-focus lens of the present invention, at least the light passage region in the container may have the shape of a lens having a positive refractive power.

If this arrangement is adopted, the variable-focus lens of the present invention can be used as a convex variable-focus lens.

In the variable-focus lens of the present invention, at least the light passage region in the container may have the shape of a lens with a negative refractive power.

If this arrangement is adopted, the variable-focus lens of the present invention can be used as a concave variable-focus lens.

In the variable-focus lens of the present invention, at least the light passage region in the container may have the shape of an aspheric lens.

If this arrangement is adopted, the variable-focus lens of the present invention can be used as an aspheric variable-focus lens.

The present invention also provides an image taking apparatus having an image taking lens which includes the variable-focus lens of the present invention, and which performs focal length adjustment and focusing with the variable-focus lens, wherein an image signal is generated by performing an image taking operation including capturing subject light which enters the image taking apparatus through the image taking lens.

Since the image taking apparatus of the present invention has the image taking lens capable of performing focal length adjustment and focusing with the variable-focus lens of the present invention, it can perform both a zooming function and a focusing function by using one zoom lens and can therefore be made simpler in structure in smaller in size.

The variable-focus lens of the present invention is capable of freely changing the refractive power, operating with a reduced deterioration in performance, and also performing both a zooming function and a focusing function by using one lens body. The image taking apparatus of the present invention has a focal-length-variable image taking lens including the variable-focus lens of the present invention and can therefore be made simpler in structure and smaller in size.

DETAILED DESCRIPTION OF THE INVENTION

The present invention will be described with respect to embodiments thereof.

Figure 1:
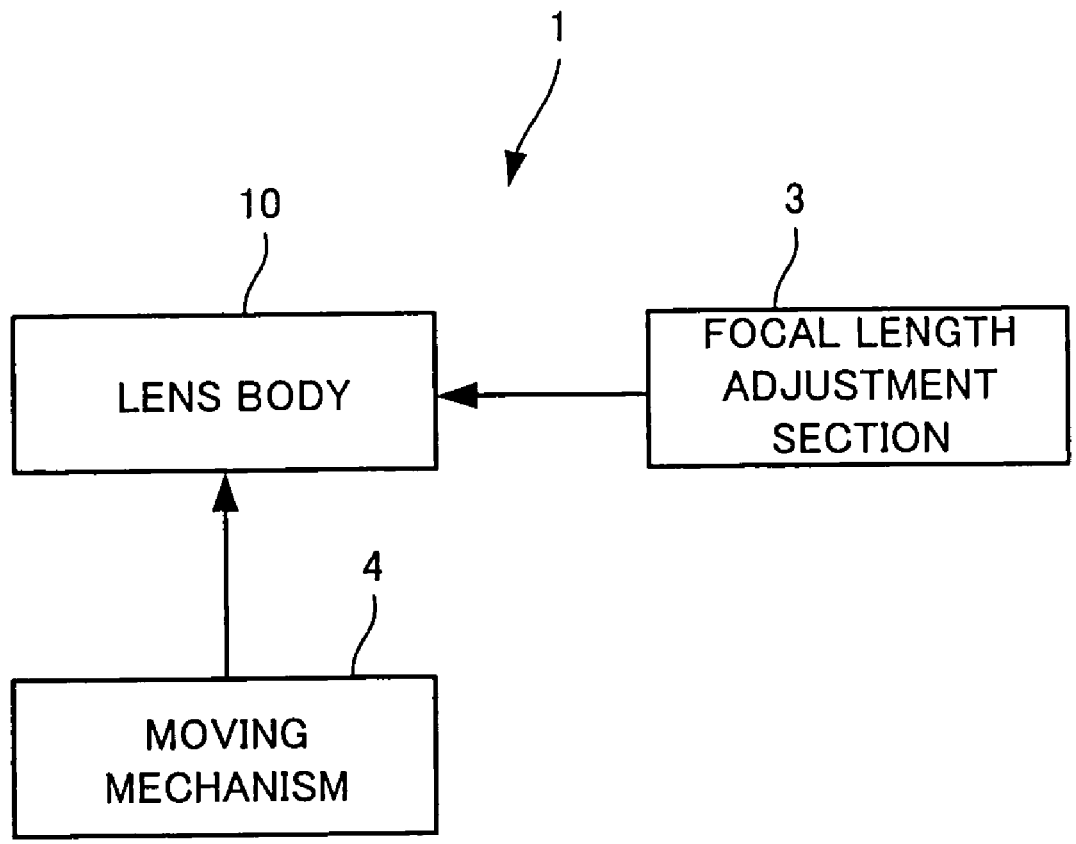
FIG. 1 is a diagram showing a sectional configuration of a variable-focus lens in a first embodiment of the present invention.
Figure 2:
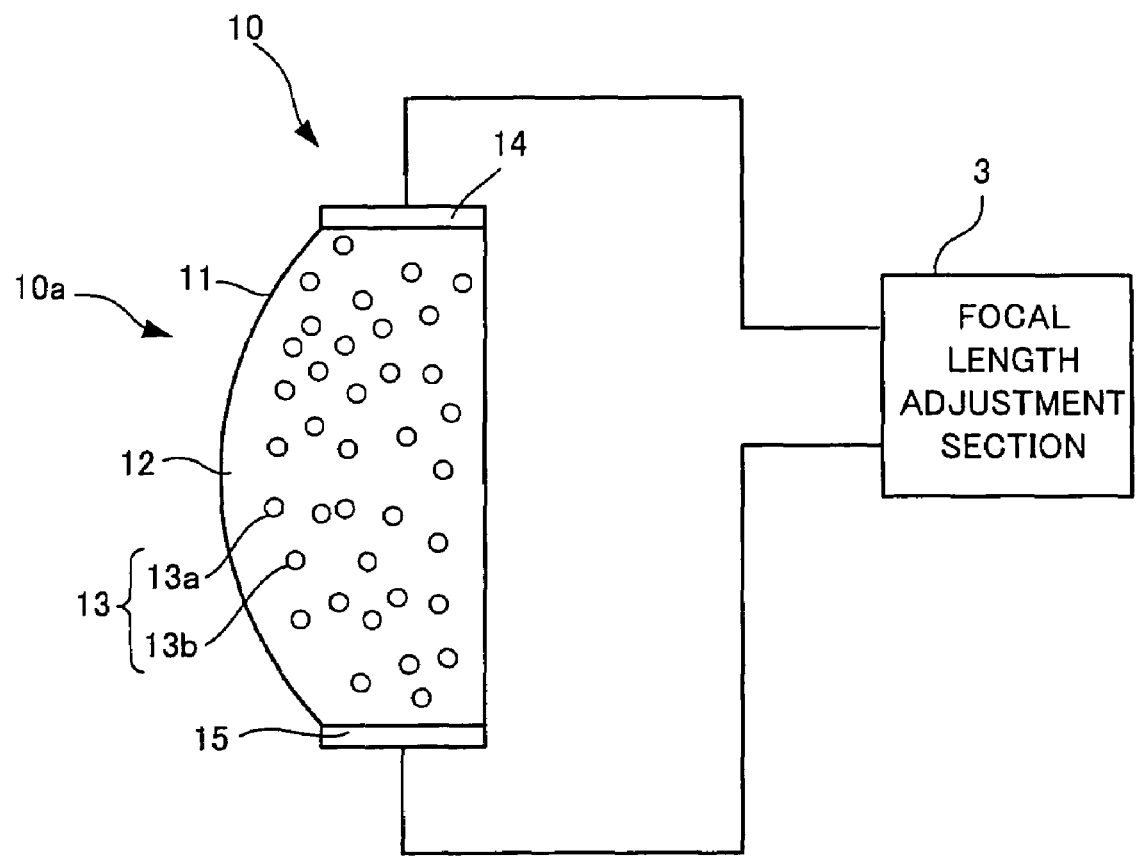
FIG. 2 is a diagram showing a lens body and a focal length adjustment section constituting the variable-focus lens shown in FIG. 1.

FIG. 1 is a diagram showing the structure of a variable-focus lens 1 which is a first embodiment of the present invention. FIG. 2 is a diagram showing a lens body 10 and a focal length adjustment section 3 constituting the variable-focus lens shown in FIG. 1.

The variable-focus lens 1 shown in FIG. 1 has the lens body 10, the focal length adjustment section 3, and a moving mechanism 4.

The lens body 10 includes a container 11 which is light-transmissive at least in a light passage region 10*a*, and which has the shape of a lens as shown in FIG. 2. At least the light passage region 10*a* of the container 11 has the shape of a lens having a convex outer surface. This lens body 10 corresponds to an example of the lens body in accordance with the present invention, and the container 11 corresponds to an example of the container in accordance with the present invention.

In the lens body 10, a light-transmissive dispersion medium 12 is provided in a state of being enclosed in the container 11. The dispersion medium 12 is an example of the dispersion medium in accordance with the present invention.

In the lens body 10, a dispersoid 13 is also provided which is dispersed in the dispersion medium 12, which is light-transmissive, and which has a refractive index higher than that of the dispersion medium 12. In general, a dispersion state is constituted of a dispersion medium and a dispersoid. The dispersoid is, for example, particles. The dispersoid 13 corresponds to an example of the dispersoid in accordance with the present invention.

The lens body 10 is also provided with a cathode 14 and an anode 15, which are electrodes for controlling the refraction of light passing through the light passage region 10a by effecting electrophoresis of the dispersoid 13 dispersed in the dispersion medium 12. More specifically, the dispersoid 13 are constituted of nanoparticles 13a positively charged and nanoparticles 13b negatively charged, and the cathode 14, which is an electrode of a negative polarity for attracting the dispersoid 13, and the anode 15, which is an electrode of a positive polarity for attracting the dispersoid 13, are placed in such a position as to surround the light passage region 10a in the container 11. The cathode 14 and the anode 15 are an example of the electromagnetic field generator in accordance with the present invention and correspond to an example of the electrode in accordance with the present invention.

The focal length adjustment section 3 is an adjusting section for changing the focal length of the light passage region 10a of the lens body 10 by controlling voltages applied to the cathode 14 and the anode 15. The focal length adjustment section 3 corresponds to an example of the focal length adjustment section in accordance with the present invention.

The moving mechanism 4 shown in FIG. 1 is a mechanism for moving the lens body 10 in the optical axis direction. A motor or the like is suitably used as the moving mechanism 4. The moving mechanism 4 corresponds to an example of the moving mechanism in accordance with the present invention.

Any material may be used as the material of the nanoparticles. The nanoparticles are, for example, particles of silica, alumina, zirconia, titanium oxide, tungsten oxide, zinc oxide, tin oxide or barium titanate. Preferably, the nanoparticles are particles of titanium oxide, silica gel ($SiO_2$), alumina or a polymer. The nanoparticles may be prepared by any of a solid phase method, a liquid phase method and a vapor phase method. Preferably, a liquid phase method or a vapor phase method is used. A method suitable for preparation of the nanoparticles is described in detail in a document "Preparation of Nanoparticles and Control of and Evaluation of Dispersion and Agglomeration of Nanoparticles, Technical Information Institute Co., Ltd., 2003". The particle size is preferably 100 nm or less. If the particle size exceeds 100 nm, scattering of light occurs to impair the transparency (light-transmissivity).

It is preferable to modify the surface of the nanoparticles for the purpose of improving the stability of dispersion in the dispersion medium 12. Examples of a method of modifying the surface are a method using a titanium coupling agent (such as isopropyl triisostearoyl titanate), a silane coupling agent (such as pentadecafluorodecyl trimethylsilane) or an aluminum coupling agent (such as acetoalkoxyaluminum diisopropylate) and graft polymerization. Polyethylene graft polymerization or polystyrene graft polymerization may be used as graft polymerization on titanium oxide. Graft polymerization using a silanol group may be used as graft polymerization on silica gel.

As the dispersion medium 12 in which the nanoparticles are dispersed, water or a non-aqueous organic dispersion medium may be used. A mixture of water and an organic dispersion medium may also be used. Examples of a non-aqueous organic dispersion medium preferably used as the dispersion medium 12 are hydrocarbons (such as hexane, heptane, pentane, octane and ISOPAR (a product from Exxon Corporation)), hydrocarbon aromatic compounds (such as benzene, toluene, xylene, mesitylene and ethylbenzene), halogen hydrocarbons (such as difluoropropane, dichloroethane, chloroethane and bromoethane), halogen hydrocarbon aromatic compounds (such as chlorobenzene), ether compounds (such as dibutyl ether, anisole and diphenyl ether), alcohol compounds (such as glycerin), compounds having a carbonyl group (such as propylene carbonate), nitrocompounds (such as nitromethane), nitrile compounds (such as acetonitrile and benzonitrile).

Preferably, the refractive index, specific gravity, viscosity, resistivity and dielectric constant of the dispersion medium 12 are adjusted in relation to use of the lens body 10. This adjustment may be performed by mixing a certain number of dispersion mediums.

Additives including stabilizing agents for stabilization under an acid, an alkali and a salt, a stabilizing agent for stabilization of dispersion, stabilizing agents for antioxidation and ultrasonic absorption, an antibacterial agent and a preservative agent may be added to the dispersion medium 12.

As a member forming the container 11, a glass base plate, a film or a base plate of a high polymer such as polyester, polyimide, polymethyl methacrylate, polystyrene, polypropylene, polyethylene, polyamide, nylon, polyvinyl chloride, polyvinylidene chloride, polycarbonate, polyether sulfone, a silicone resin, a polyacetal resin, a fluororesin, a cellulose derivative or polyolefin, or an inorganic base plate such as a metallic base plate or a ceramic base plate is preferably used. The container 11 has a light-transmissivity of preferably 50% or higher, more preferably 80% or higher.

Further, as the cathode 14 and the anode 15, an electrode member on which a layer of gold, silver, copper, aluminum, magnesium, nickel, platinum, carbon, an electroconductive high polymer or a metal oxide typified by tin oxide-indium oxide (ITO), tin oxide or zinc oxide is formed is preferably used. As described herein below, for use on a portion through which light is to be transmitted, transparent electrodes are preferably used. A metal oxide typified by tin oxide-indium oxide (ITO), tin oxide or zinc oxide is preferred.

In the lens body 10 shown in FIG. 2, the refraction of light passing through the light passage region 10a is controlled through electrophoresis of the dispersoid 13 which is dispersed in the light-transmissive dispersion medium 12 enclosed in the container 11 having the shape of a lens, and which has a refractive index higher than that of the dispersion medium 12, the electrophoresis being effected according to the voltage applied between the cathode 14 and the anode 15. A variable-focus lens having a focal length according to a refractive index determined by the dispersion medium 12 and the amount of movement of the dispersoid 13 in the light passage region 10a caused by electrophoresis is obtained, as described below in detail with reference to FIG. 3.

Figure 3:
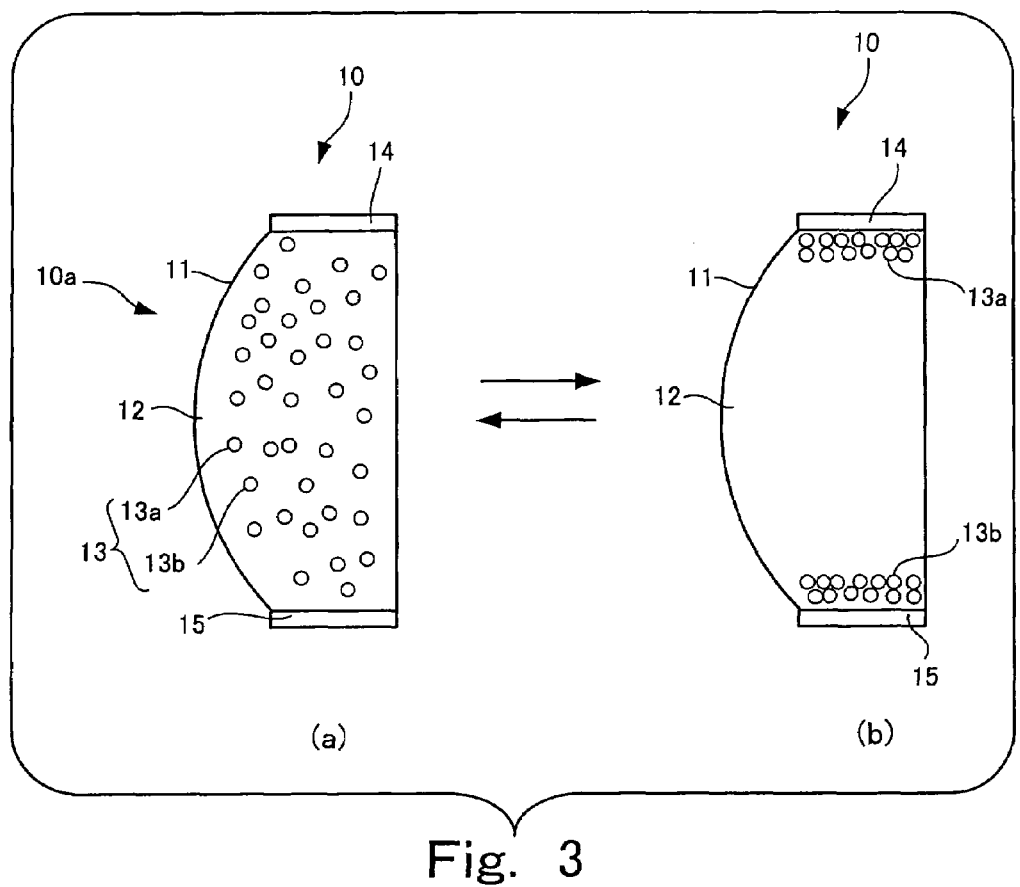
FIG. 3 is a diagram for explaining the principle of operation of the lens body shown in FIG. 2.

FIG. 3 is a diagram for explaining the operation of the lens body shown in FIG. 2.

When no voltage is applied between the cathode 14 and the anode 15, the dispersoid 13 is uniformly dispersed in the dispersion medium 12, as shown in part (a) of FIG. 3. The dispersoid 13 is constituted of nanoparticles 13a positively charged and nanoparticles 13b negatively charged. The lens body 10 in this state has a comparatively high refractive index resulting from the refractive index of the dispersion medium 12 and a refractive index determined by the amount (the number of particles) of dispersoid 13 uniformly dispersed in the dispersion medium 12.

When a predetermined voltage is applied between the cathode 14 and the anode 15, the positively charged nanoparticles 13a in the dispersoid 13 uniformly dispersed in the dispersion medium 12 are attracted to the side of cathode 14 and the negatively charged nanoparticles 13b are attracted to the side of anode 15, as shown in part (b) of FIG. 3. The lens body 10 therefore has a comparatively low refractive index determined by the refractive index of the dispersion medium 12 only. When the application of the voltage between the cathode 14 and the anode 15 is stopped, the lens body 10 is again settled in the state shown in part (a) of FIG. 3.

The amount of the dispersoid 13 moved by electrophoresis from the state of being positioned in the light passage region 10a can be freely controlled according to the waveform and the pattern of the voltage applied between the cathode 14 and the anode 15, the placement, shape and structure of the cathode 14 and the anode 15, and other factors. Therefore, the distribution rate can be determined with flexibility in comparison with the technique of controlling the refraction of light by using the refractive index of liquid crystal molecules as disclosed in the patent document 1. Also, the dispersoid 13 dispersed in the dispersion medium 12 is moved by an electric field produced by applying a voltage between the cathode 14 and the anode 15 and no current is caused. Therefore, the risk of electrolysis is reduced in comparison with the technique using a current flowing through an electroconductive aqueous solution as proposed in the non-patent document 1. Consequently, the deterioration of the performance of the lens can be limited over a long time period.

A method of changing the refractive index stepwise by electrophoresis will be described. When the nanoparticles positively charged and negatively charged (hereinafter referred to as charged particles) are moved by electrophoresis, the amount of the moved charged particles can be changed according to the waveform and the pattern of the applied voltage. An optical element capable of changing the refractive index stepwise can be obtained as a result of use of the method of changing the amount of the charged particles positioned in the light passage region 10a in the lens body 10. A method of applying a rectangular wave is preferably used to change the amount of charged particles. In a document "IDWO3 Proceedings (Proceedings of the 10th International Display Workshops), p 239, 2003", an example of 4-step-gradation display by electrophoresis is reported. An example of 8-step-gradation display is also reported in "IDWO3 Proceedings, p 243, 2003". It is possible to change the amount of charged particles stepwise by using one of the application methods for the display described in this document.

In the variable-focus lens 1 of this embodiment, the dispersoid 13, which is dispersed in the light-transmissive dispersion medium 12 enclosed in the container 11 provided in the lens body 10, which is light-tansmissive, and which has a refractive index higher than that of the dispersion medium 12, is moved by electrophoresis to change the focal length of the light passage region 10a in the lens body 10, and the lens body 10 is moved in the optical axis direction. Therefore, the variable-focus length lens is obtained as a lens whose focal length is changed according to a refractive index determined by the dispersion medium 12 and the amount of movement of the dispersoid 13 in the light passage region 10a caused by electrophoresis, and the lens can be moved in the optical axis direction. Therefore, if the variable-focus lens 1 is provided in a digital camera, focusing can be performed as described below. The focal length of the light passage region 10a in the lens body 10 is changed by causing electrophoresis of the dispersoid 13 provided in the lens body 10 constituting the variable-focus lens 1. The focal length is thereby adjusted between a telephoto end and a wide-angle end to set a desired image-taking field angle. Thereafter (or simultaneously), the lens body 10 is moved frontward or rearward in the optical axis direction for focusing. Thus, one lens body 10 can have both the zooming function and the focusing function. The digital camera can therefore be made simpler in structure and smaller in size. The amount of the dispersoid moved by electrophoresis can be freely controlled according to the waveform and the pattern of a voltage applied between the electrodes, the placement, shape and structure of the electrodes, and other factors. Therefore, the refractive index distribution can be obtained with flexibility in comparison with the technique of controlling the refraction of light by using the refractive index of liquid crystal molecules as proposed in the patent document 1. Also, the dispersoid dispersed in the dispersion medium is moved by an electric field produced by applying a voltage between the electrodes and no current is caused therebetween. Therefore, the risk of electrolysis is reduced in comparison with the technique using a current flowing through an electroconductive aqueous solution as proposed in the non-patent document 1. Consequently, the deterioration of the performance of the lens can be limited over a long time period.

An embodiment of the lens body will be described.

Nanoparticles of titanium oxide were used as dispersoid 13 in this embodiment. The titanium oxide nanoparticles were prepared by a method described below. Hydrous titanium oxide was made formless by an alkali, thereafter aged in hydrochloric acid, and formed into particles having a particle size of 10 nm by a heat treatment. The surfaces of the particles were processed by using a titanium coupling agent (isopropyl triisostearoyl titanate) solution. An optical element was made as the lens body 10 by dispersing the thus-obtained titanium oxide nanoparticles in ISOPAR (a product from Exxon Corporation).

When about 20% by volume of the titanium oxide nanoparticles (having a refractive index of 2.30) were mixed in ISOPAR (having a refractive index of 1.48), the refractive index changed from 1.48 to 1.644. In the case of mixing of about 30% by volume, the refractive index changed from 1.48 to 1.726. By using these mixtures, lenses (mediums containing nanoparticles) having a shape shown below were made.

Figure 4:
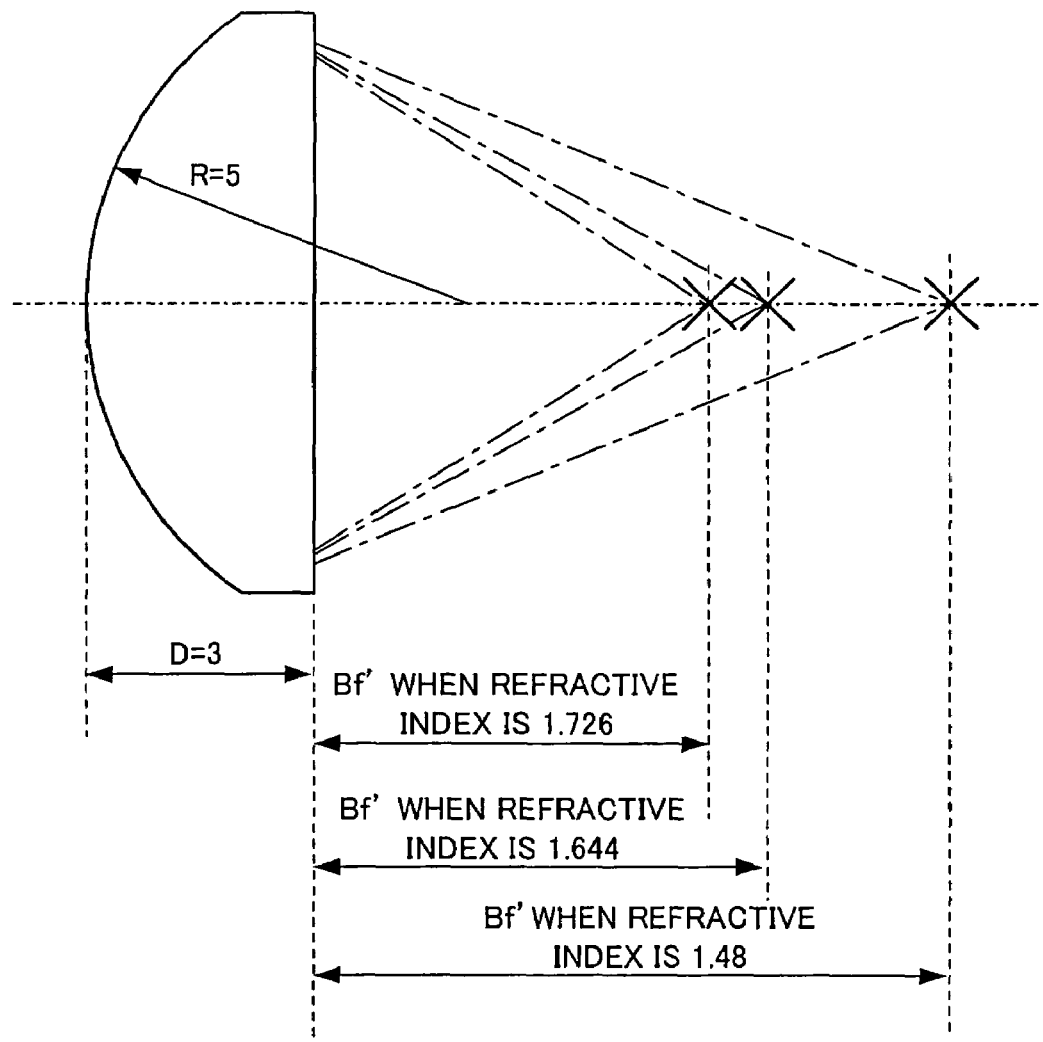
FIG. 4 is a diagram showing the back focus of the lens body when the refractive index is selectively set to 1.48, 1.644 and 1.726.

FIG. 4 is a diagram showing the back focus of the lens body when the refractive-index was changed from 1.48 to 1.644 and to 1.726.

| Lens curvature R: | 5.00 mm |
|---|---|
| Lens thickness D: | 3.00 mm |

(1_1) In the case where only ISOPAR (refractive index: 1.48) was contained,

| Focal length: | 10.42 mm |
| --- | --- |
| Back focus: | 8.39 mm |
| Front focus: | −10.42 mm |

(1_2) In the case where 20% of titanium oxide nanoparticles were mixed (refractive index: 1.644)

| Focal length: | 7.76 mm |
| --- | --- |
| Back focus: | 5.94 mm |
| Front focus: | −7.76 mm |

(1_3) In the case where 30% of titanium oxide nanoparticles were mixed (refractive index: 1.726)

| Focal length: | 6.89 mm |
| --- | --- |
| Back focus: | 5.15 mm |
| Front focus: | −6.89 mm |

Thus, the lens was capable of changing the focal length from 10.42 to 7.76 or to 6.89.

When the refractive index was selectively set to 1.48, 1.644 and 1.726, the focal length of the lens body was 10.42, 7.76 and 6.89, as described above. Back focus values corresponding to these focal length values are as shown in FIG. 4. The back focus Bf' is maximum (8.39) when the refractive index is 1.48, as shown in FIG. 4. The back focus Bf' is reduced (to 5.94 and to 5.15) as the refractive index is changed to 1.644 and to 1.726.

A lens (a medium containing nanoparticles) using a combination of an ordinary glass (BK7; refractive index 1.51633) was made.

Figure 5:
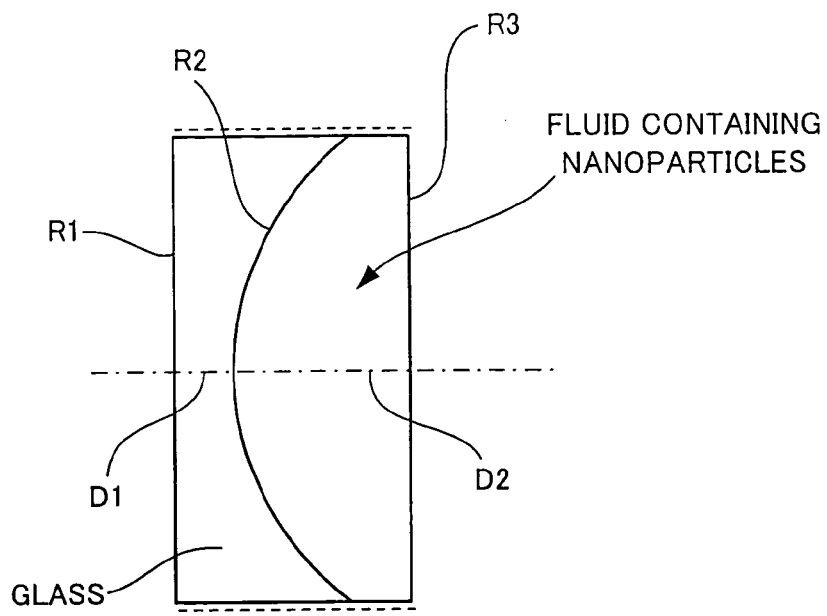
FIG. 5 is a diagram showing the radius of curvature and thickness of a lens combined with ordinary glass.

FIG. 5 is a diagram showing the curvature and thickness of the lens using a combination of the ordinary glass.

| Glass radius curvature R1: | infinity |
| --- | --- |
| Glass thickness D1: | 1.00 mm |
| Lens curvature R2: | 5.00 mm |
| Lens thickness D2: | 3.00 mm |
| Lens curvature R3: | infinity |

(2_1) In the case where only ISOPAR (refractive index: 1.48) was contained,

| Focal length: | −137.6 mm |
| --- | --- |
| Back focus: | 133.7 mm |
| Front focus: | 138.3 mm |

(2_2) In the case where 20% of titanium oxide nanoparticles were mixed (refractive index: 1.644)

| Focal length: | 39.2 mm |
| --- | --- |
| Back focus: | 37.3 mm |
| Front focus: | −38.5 mm |

(2_3) In the case where 30% of titanium oxide nanoparticles were mixed (refractive index: 1.726)

| Focal length: | 23.8 mm |
| --- | --- |
| Back focus: | 22.1 mm |
| Front focus: | −23.2 mm |

Thus, the lens was capable of changing the focal length from −137.6 to 39.2 or to 23.8. The minus sign "−" denotes the front (objective) side and this change indicates that a concave lens changed into a convex lens.

Further, a lens having nanoparticles enclosed in an ordinary glass (BK7; refractive index 1.51633) was made, as described below.

Figure 6:
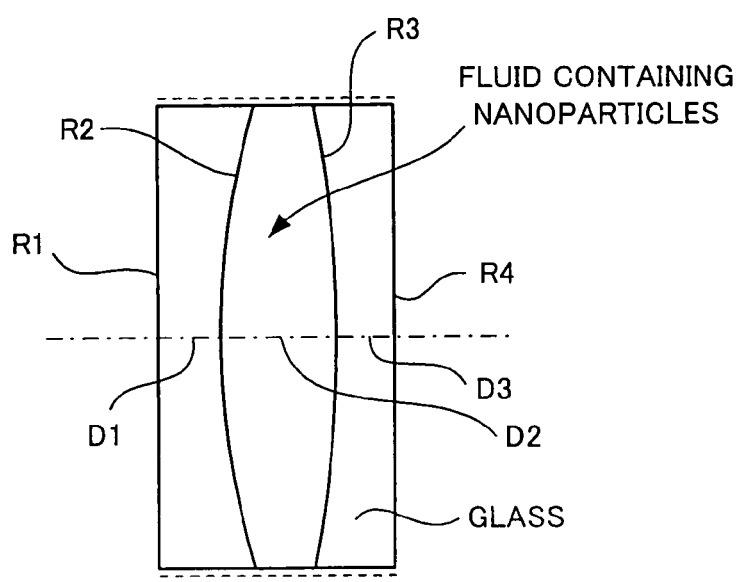
FIG. 6 is a diagram showing the radius of curvature and thickness of a lens having nanoparticles enclosed in ordinary glass.

FIG. 6 is a diagram showing the radius of curvature and thickness of the lens having nanoparticles enclosed in the ordinary glass.

| First glass radius curvature R1: | infinity |
| --- | --- |
| First glass thickness D1: | 1.00 mm |
| Lens front-side radius curvature R2: | 13.634 mm |
| Second glass thickness D2: | 2.00 mm (a medium containing nanoparticles) |
| Lens rear-side radius curvature R3: | −20.2 mm |
| Second glass thickness D3: | 1.00 mm |
| Second glass radius curvature R4: | infinity |

(3_1) In the case where only ISOPAR (refractive index: 1.48) was contained,

| Focal length: | −223.7 mm |
| --- | --- |
| Back focus: | −225.2 mm |
| Front focus: | 224.9 mm |

(3_2) In the case where 20% of titanium oxide nanoparticles were mixed (refractive index: 1.644)

| Focal length: | 64.1 mm |
| --- | --- |
| Back focus: | 62.7 mm |
| Front focus: | −62.9 mm |

(3_3) In the case where 30% of titanium oxide nanoparticles were mixed (refractive index: 1.726)

| Focal length: | 39.1 mm |
| --- | --- |
| Back focus: | 37.7 mm |
| Front focus: | −38.0 mm |

Thus, the lens was capable of changing the focal length from −223.7 to 64.1 or to 39.1.

Lens bodies in various forms usable in place of the lens body 10 shown in FIGS. 1, 2, and 3 will be described.

Figure 7:
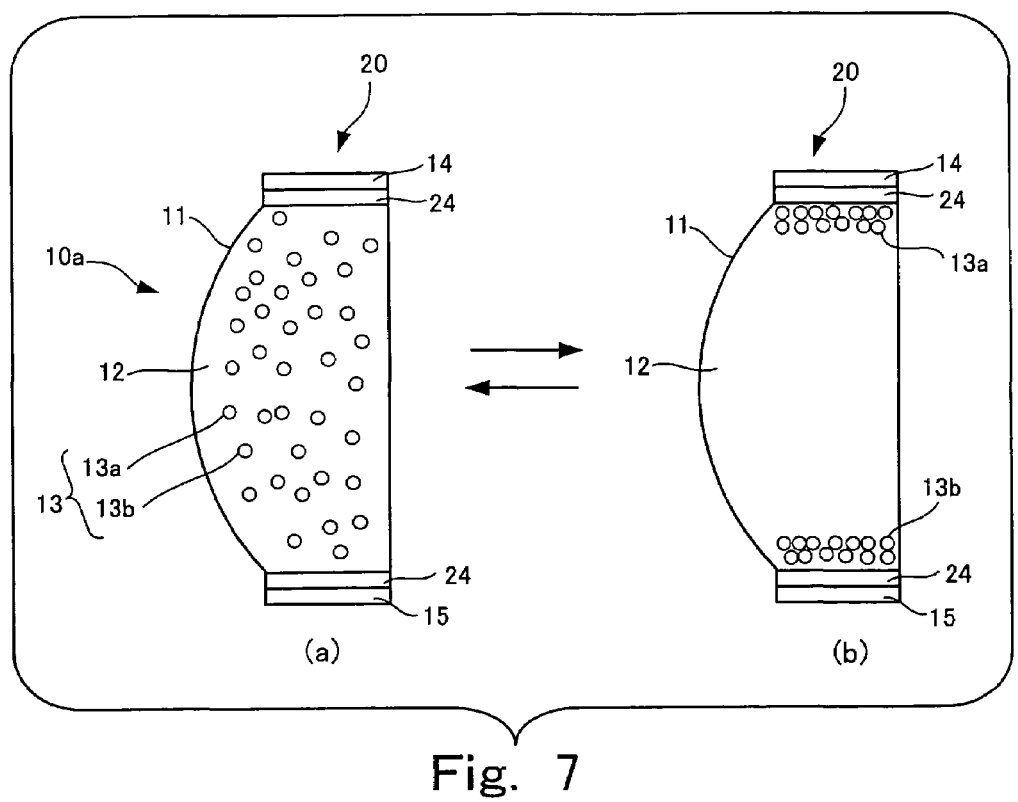
FIG. 7 is a diagram showing a sectional configuration of a lens body in which the inner surface of an electrode is coated with an insulating film.

FIG. 7 is a diagram showing a sectional configuration of a lens body 20 in which the inner surface of an electrode is coated with an insulating film.

The lens body 20 shown in FIG. 7 differs from the lens body 10 shown in FIG. 3 in that the inner surfaces of the cathode 14 and the anode 15 are coated with an insulating film 24 which is placed adjacent to the dispersion medium 12. In this lens body 20, the insulating film 24 provided as a coating on the inner surfaces of the cathode 14 and the anode 15 prevents agglomeration of nanoparticles 13a and 13b on the cathode 14 and the anode 15. The insulating film 24 is a polyimide insulating film. Therefore, the cathode 14 and the anode 15 have excellent heat resistance and durability. In the lens body 20 thus constructed, the focal length of the light passage region 10a may be changed by controlling voltages applied to the cathode 14 and the anode 15.

Figure 8:
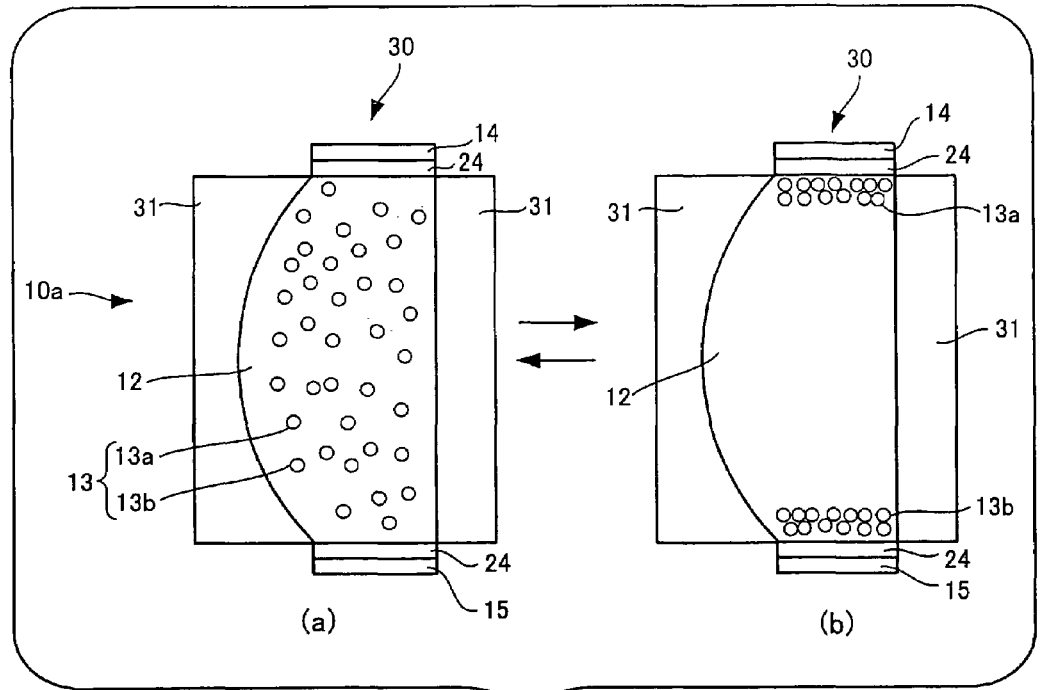
FIG. 8 is a diagram showing a sectional configuration of a lens body provided with a container formed of a plastic.

FIG. 8 is a diagram showing a sectional configuration of a lens body 30 provided with a container 31 formed of a plastic.

The lens body 30 shown in FIG. 8 is provided with a container 31 which is light-transmissive at least in a light passage region 10a, and which has the shape of a lens. At least a portion of the container 31 in the light passage region 10a is formed of a plastic. Therefore, the container 31 can be realized as a lightweight container having high impact resistance. In the lens body 30 having the thus-formed container 31, the focal length of the light passage region 10a may be changed by controlling voltages applied to the cathode 14 and the anode 15. The container 31 may be formed of glass instead of being formed of a plastic.

Figure 9:
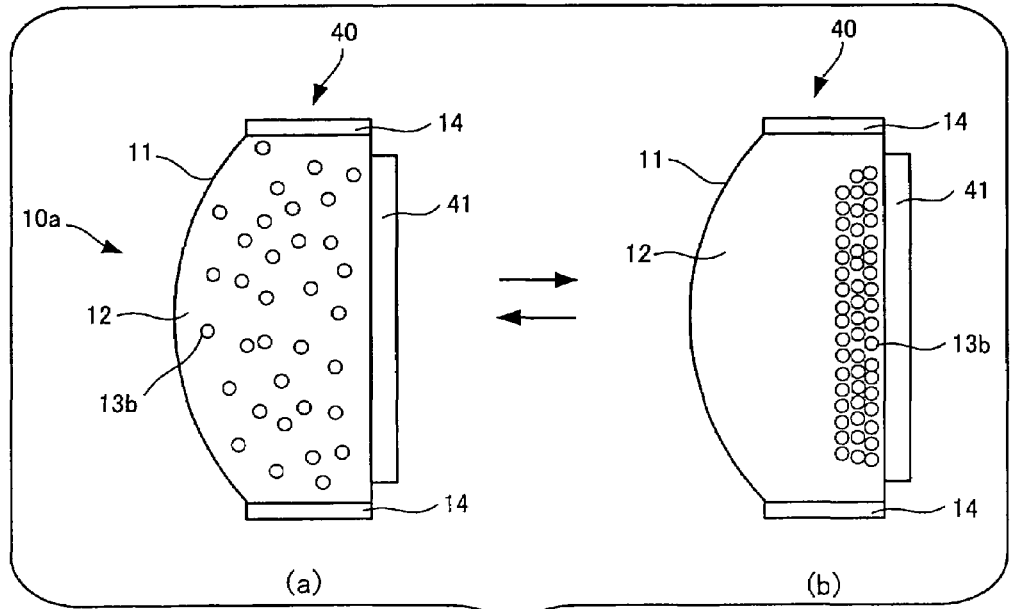
FIG. 9 is a diagram showing a sectional configuration of a lens body provided with a container having an anode placed on a back surface in a light passage region.

FIG. 9 is a diagram showing a sectional configuration of a lens body 40 provided with a container 31 having an anode placed on a back surface in a light passage region.

The lens body 40 shown in FIG. 9 has negatively charged nanoparticles 13b dispersed in a dispersion medium 12. A cathode 14 is placed in such a position in a container 11 as to surround a light passage region 10a. Further, an anode 41 for attracting nanoparticles 13b is placed on a back surface of the container 11 in the light passage region 10a.

When no voltage is applied between the cathode 14 and the anode 41, the nanoparticles 13b are uniformly dispersed in the dispersion medium 12, as shown in part (a) of FIG. 9. That is, the nanoparticles 13b are uniformly dispersed in a convex portion of the container 11 in the light passage region 10a as well. The lens body 40 therefore functions as a lens having a positive refractive power. When a predetermined voltage is applied between the cathode 14 and the anode 41, the nanoparticles 13b uniformly dispersed in the dispersion medium 12 are attracted to the anode 41, as shown in part (b) of FIG. 9. At this time, therefore, no nanoparticles 13b are dispersed in the convex portion of the container 11, so that the positive refractive power is reduced. The positive refractive power can be adjusted in this way.

Figure 10:
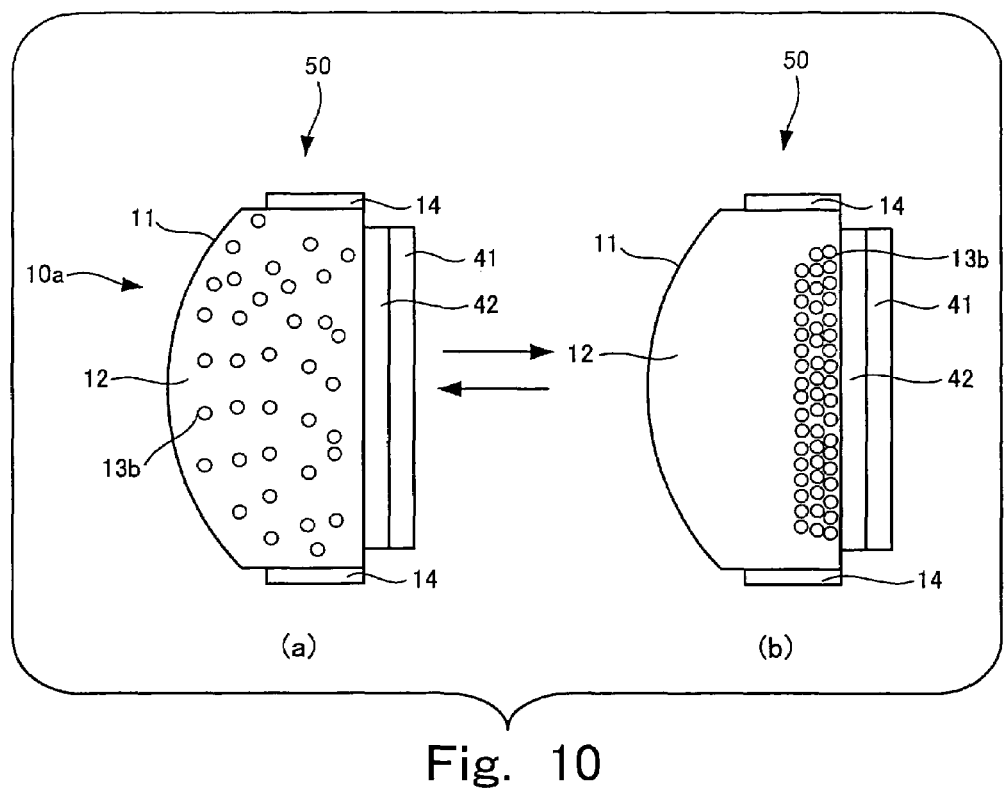
FIG. 10 is a diagram showing a sectional configuration of a lens body in which the inner surface of an anode is coated with an insulating film.

FIG. 10 is a diagram showing a sectional configuration of a lens body 50 in which the inner surface of an anode is coated with an insulating film.

The lens body 50 shown in FIG. 10 differs from the lens body 40 shown in FIG. 9 in that the inner surface of the anode 41 is coated with an insulating film 42 which is placed adjacent to the dispersion medium 12. In this lens body 50, the insulating film 42 provided as a coating on the inner surface of the anode 42 prevents agglomeration of nanoparticles 13b on the anode 41. The insulating film 42 is a polyimide insulating film. Therefore, the anode 42 has excellent heat resistance and durability.

Figure 11:
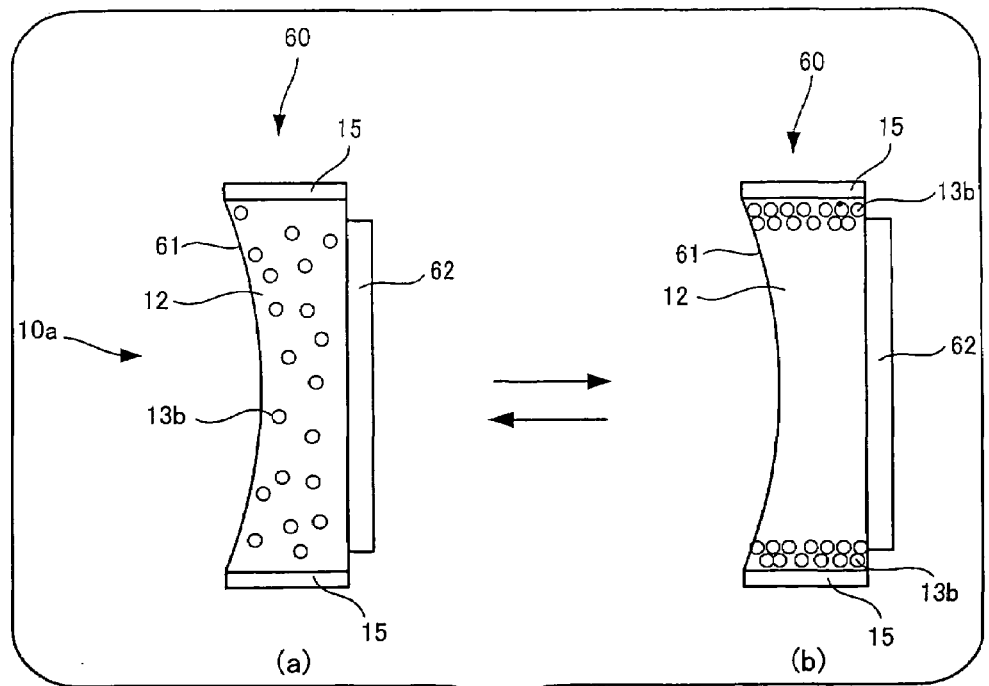
FIG. 11 is a diagram showing a sectional configuration of a lens body provided with a container having the shape of a lens having a concave outer surface.

FIG. 11 is a diagram showing a sectional configuration of a lens body 60 provided with a container 61 having the shape of a lens having a convex outer surface.

The container 61 provided in the lens body 60 shown in FIG. 11 is light-transmissive at least in a light passage region 10a, and has the shape of a lens. At least the light passage region 10a of the container 61 has the shape of a lens having a concave outer surface.

The lens body 60 has an anode 15 placed in such a position on the container 61 as to surround the light passage region 10a. Further, the lens body 60 has a cathode 62 placed on a back surface of the container 61 in the light passage region 10a.

When no voltage is applied between the anode 15 and the cathode 62, nanoparticles 13b are uniformly dispersed in the dispersion medium 12, as shown in part (a) of FIG. 11. That is, the nanoparticles 13b are uniformly dispersed in a concave portion of the container 61 in the light passage region 10a as well. The lens body 60 therefore functions as a lens having a negative refractive power. When a predetermined voltage is applied between the anode 15 and the cathode 62, the nanoparticles 13b uniformly dispersed in the dispersion medium 12 are attracted to the side of anode 15, as shown in part (b) of FIG. 11. At this time, therefore, no nanoparticles 13b are dispersed in the greater part of the concave portion of the container 61 (the portion other than upper and lower portions shown in part (b) of FIG. 11), i. e., in a large portion of the container in the light passage region 10a, so that the negative refractive power is reduced.

Figure 12:
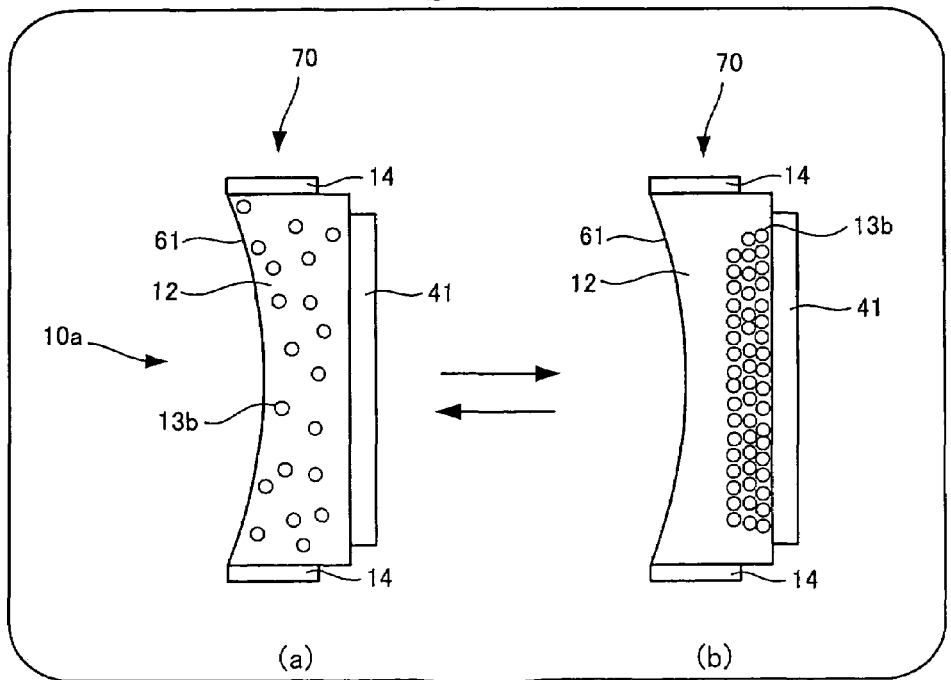
FIG. 12 is a diagram showing a sectional configuration of a lens body which is provided with a container having the shape of a lens having a concave outer surface, and which differs from the lens body shown in FIG. 9.

FIG. 12 is a diagram showing a sectional configuration of a lens body 70 provided with a container 61 having the shape of a lens with a convex outer surface, and differing from the lens body shown in FIG. 11.

The lens body 70 shown in FIG. 11 has a cathode 14 placed in such a position on the container 61 as to surround a light passage region 10a. The lens body 70 also has an anode 41 for attracting nanoparticles 13b. The anode 41 is placed on a back surface of the container 61 in the light passage region 10a.

When no voltage is applied between the cathode 14 and the anode 41, nanoparticles 13b are uniformly dispersed in a dispersion medium 12, as shown in part (a) of FIG. 12. That is, nanoparticles 13b are also dispersed uniformly in a concave portion of the container 61 in the light passage region 10a. The lens body 70 therefore functions as a lens having a negative refractive power. When a predetermined voltage is applied between the cathode 14 and the anode 41, the nanoparticles 13b uniformly dispersed in the dispersion medium 12 are attracted to the side of anode 41, as shown in part (b) of FIG. 12. At this time, therefore, no nanoparticles 13b are dispersed in the concave portion of the container 61, so that the negative refractive power is reduced.

Figure 13:
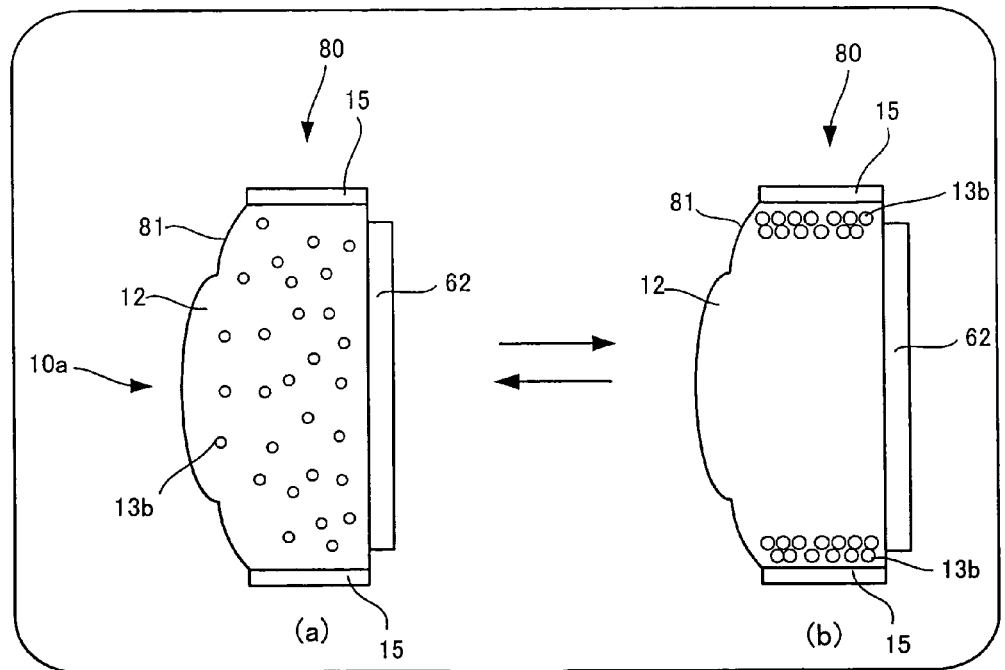
FIG. 13 is a diagram showing a sectional configuration of a lens body provided with a container having the shape of an aspheric lens.

FIG. 13 is a diagram showing a sectional configuration of a lens body 80 provided with a container 81 having the shape of an aspheric lens.

The container 81 provided in the lens body 80 is light-transmissive at least in a light passage region 10a, and at least the light passage region 10a of the container 81 has the shape of an aspheric lens.

When no voltage is applied between an anode 15 and a cathode 62, nanoparticles 13b negatively charged are uniformly dispersed in a dispersion medium 12, as shown in part (a) of FIG. 13. That is, nanoparticles 13b are also dispersed uniformly in the portion of the container 81 having the aspheric lens shape in the light passage region 10a. The lens body 80 therefore functions as an aspheric lens. When a predetermined voltage is applied between the anode 15 and the cathode 62, the nanoparticles 13b uniformly dispersed in the dispersion medium 12 are attracted to the side of anode 15, as shown in part (b) of FIG. 13. At this time, therefore, no nanoparticles 13b are dispersed in the portion of the container 81 having the aspheric lens shape, so that the effect of the aspheric lens is reduced.

Figure 14:
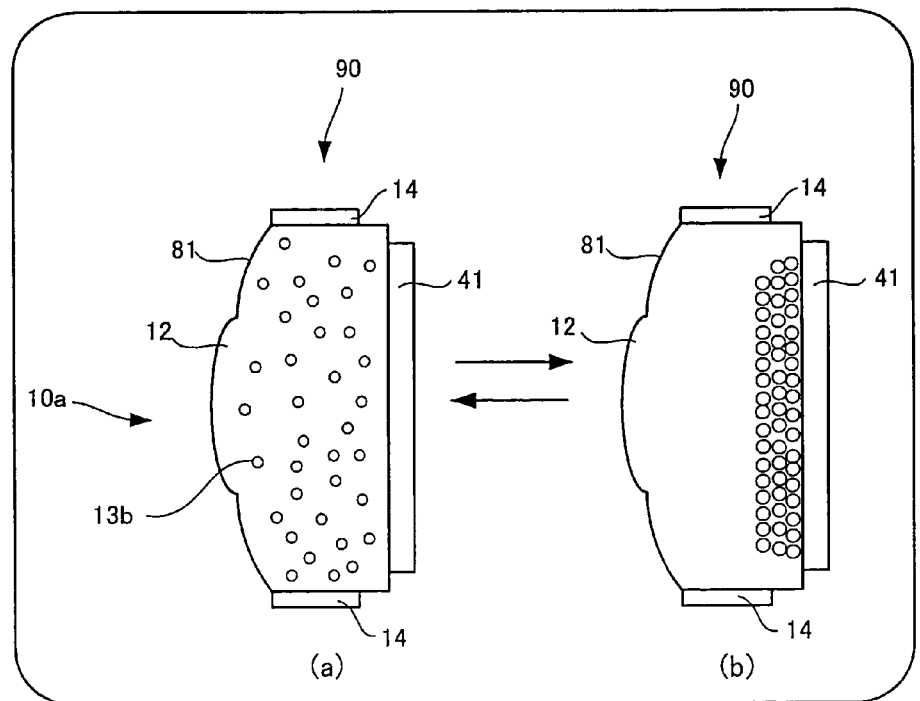
FIG. 14 is a diagram showing a sectional configuration of a lens body which is provided with a container having the shape of an aspheric lens, and which differs from the lens body shown in FIG. 11.

FIG. 14 is a diagram showing a sectional configuration of a lens body 90 provided with a container 81 having the shape of an aspheric lens, and differing from the lens body shown in FIG. 13.

The lens body 90 shown in FIG. 14 has a cathode 14 placed in such a position on the container 81 as to surround a light passage region 10a. The lens body 90 also has an anode 41 for attracting nanoparticles 13b. The anode 41 is placed on a back surface of the container 81 in the light passage region 10a.

When no voltage is applied between the cathode 14 and the anode 41, nanoparticles 13b are uniformly dispersed in the dispersion medium 12, as shown in part (a) of FIG. 14. That is, nanoparticles 13b are also dispersed uniformly in the portion of the container 81 having the aspheric lens shape in the light passage region 10a. The lens body 90 therefore functions as an aspheric lens. When a predetermined voltage is applied between the cathode 14 and the anode 41, the nanoparticles 13b uniformly dispersed in the dispersion medium 12 are attracted to the side of anode 41, as shown in part (b) of FIG. 14. Therefore, no nanoparticles 13b are dispersed in the portion of the container 81 having the aspheric lens shape, so that the effect of the aspheric lens is reduced.

Figure 15:
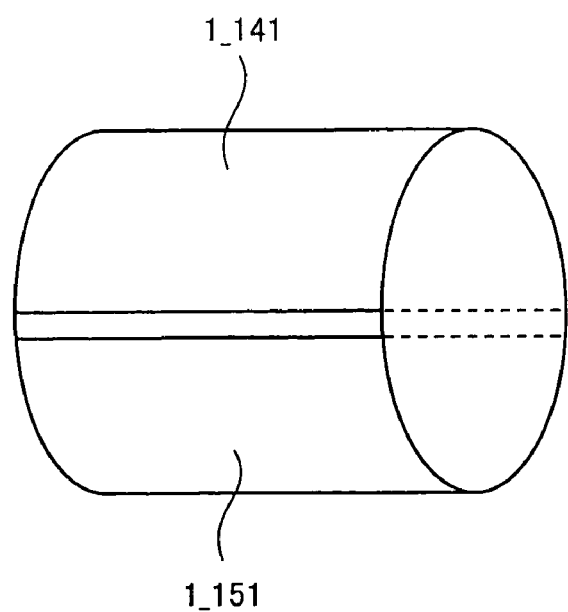
FIG. 15 is a diagram showing an example of the placement of electrodes.

FIG. 15 is a diagram showing an example of the placement of electrodes.

Electrodes 1_141 and 1_151 shown in FIG. 15 are placed on an upper surface and a lower surface, respectively, of a container constituting a lens body so as to surround a light passage region. Electrodes 1_141 and 1_151 may be placed in this manner and a negative voltage and a positive voltage for example may be respectively applied to the electrodes 1_141 and 1_151 to attract positive nanoparticles and negative nanoparticles to the upper surface and the lower surface of the container, respectively.

Figure 16:
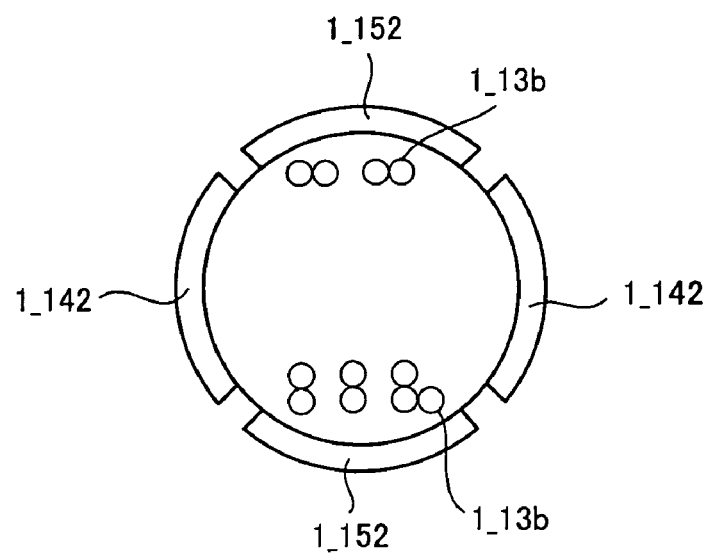
FIG. 16 is a diagram showing another example of the placement of electrodes.

FIG. 16 is a diagram showing another example of the placement of electrodes.

Referring to FIG. 16, first and second electrodes 1_142 are placed at left and right positions on a container constituting a lens body on the periphery of a light passage region, and third and fourth electrodes 1_152 are placed at upper and lower positions on the container constituting the lens body on the periphery of the light passage region. The electrodes may be placed in this manner; negative nanoparticles 1_13b may be dispersed in a dispersion medium; the first and second electrodes 1_142 maybe used as a cathode; the third and fourth electrodes 1_152 may be used as an anode; and the positive voltage applied to the fourth electrode 1_152 may be set higher than that applied to the third electrode 1_152 to enable different amounts of nanoparticles 1_13b to be attracted to the third and fourth electrodes 1_152.

Figure 17:
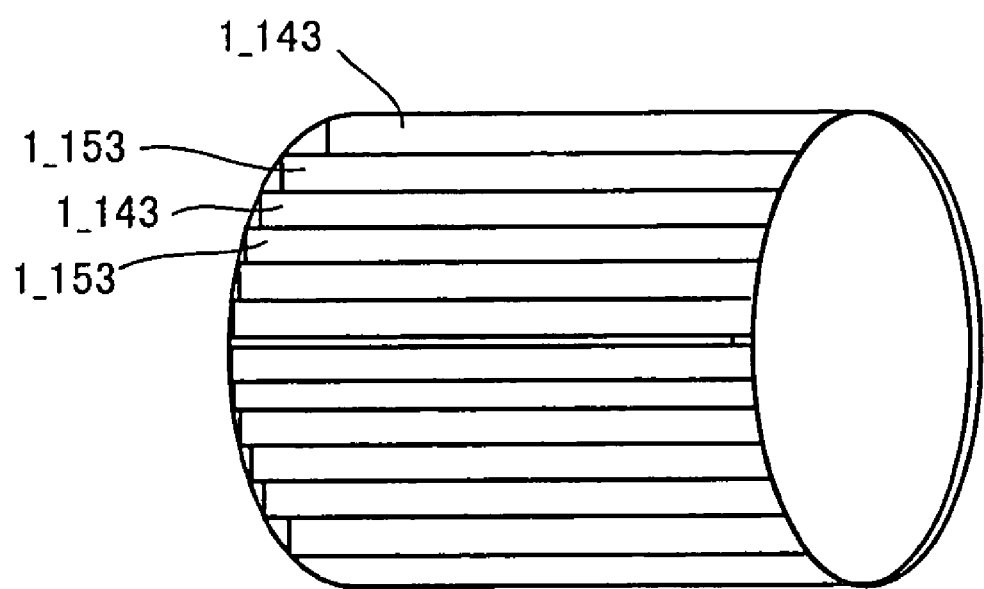
FIG. 17 is a diagram showing a further example of the placement of electrodes.

FIG. 17 is a diagram showing a further example of the placement of electrodes.

Referring to FIG. 17, cathodes 1_143 and anodes 1_153 are alternately placed on the side surface surrounding a light passage region in the surface of a container constituting a lens body. Cathodes 1_143 and anodes 1_153 may be alternately placed in this manner to freely control the distributions of positive nanoparticles and negative nanoparticles.

Figure 18:
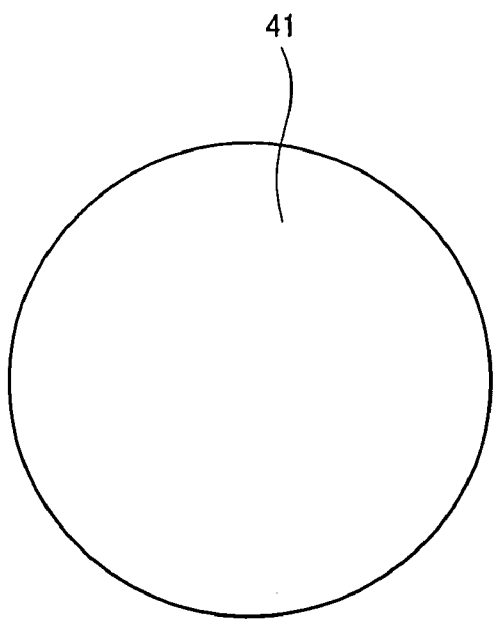
FIG. 18 is a plan view of an anode placed on a back surface in a light passage region of a container constituting a lens body.

FIG. 18 is a plan view of an anode placed on a back surface in a light passage region of a container constituting a lens body.

FIG. 18 shows in a plan view an anode 41 placed on a back surface in a light passage region of a container constituting a certain lens body. The anode 41 which is a circular shape electrode may be placed on the back surface of the container in the light passage region to attract negative nanoparticles uniformly distributed in a dispersion medium in the container.

Figure 19:
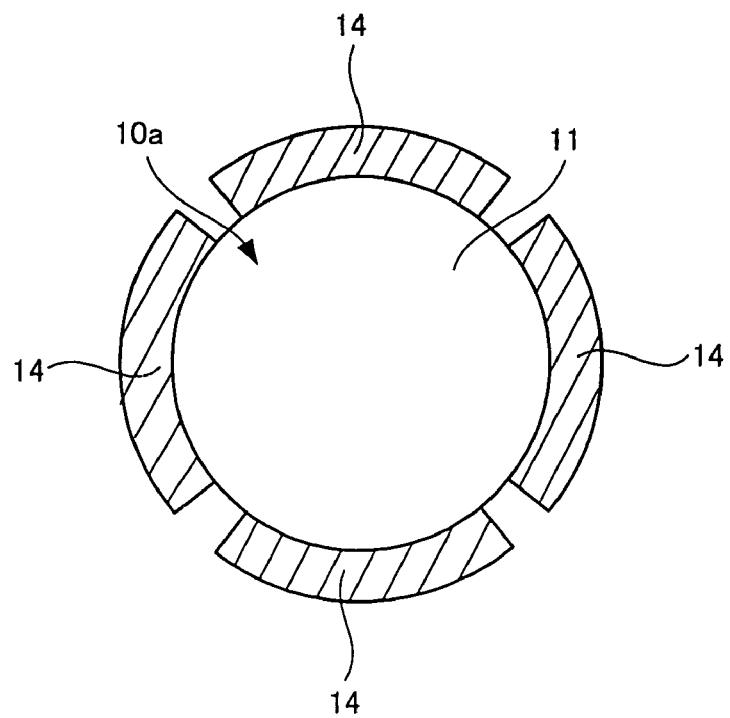
FIG. 19 is a diagram showing a view, as seen from the light entrance side, of a container constituting a lens body and cathodes placed in such positions on the container as to surround a light passage region.

FIG. 19 is a diagram showing a light-entrance-side view of a container constituting a lens body and cathodes placed in such positions on the container as to surround a light passage region.

Four divided cathodes 14 are placed in such positions on the container 11 shown in FIG. 19 as to surround the light passage region 10a. The distribution of positive nanoparticles dispersed in a dispersion medium may be attracted by using four divided cathodes 14 provided in such positions on the container 11 as to surround the light passage region 10a as described above.

Figure 20:
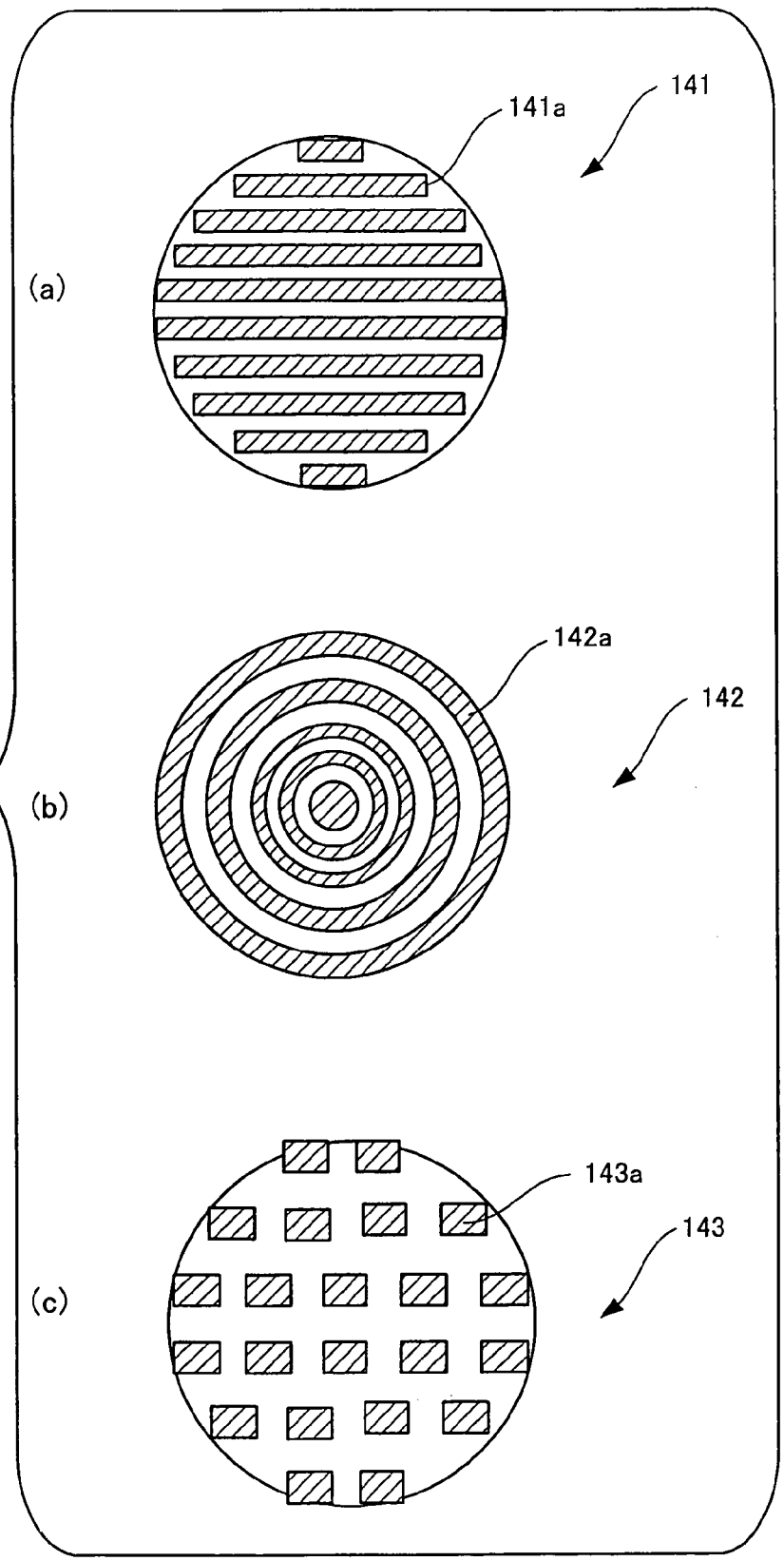
FIG. 20 is a diagram showing examples of various patterns for placement of an anode on a back surface in a light passage region of a container constituting a lens body.

FIG. 20 is a diagram showing examples of various patterns for placement of an anode on a back surface in a light passage region of a container constituting a lens body.

An anode 141 shown in part (a) of FIG. 20 has a pattern 141a of electrode elements in the form of horizontal stripes. An anode 142 shown in part (b) of FIG. 20 has pattern 142a of concentric-circle electrode elements. An anode 143 shown in part (c) of FIG. 20 has a pattern 143a of electrode elements in matrix form. Voltages having various waveforms and various application patterns may be selectively applied to an electrode pattern such as the pattern 141a, 142a or 143a to control the distribution of negative nanoparticles. The refractive index of the variable-focus lens may be freely controlled by controlling the distribution of negative nanoparticles in this manner.

Figure 21:
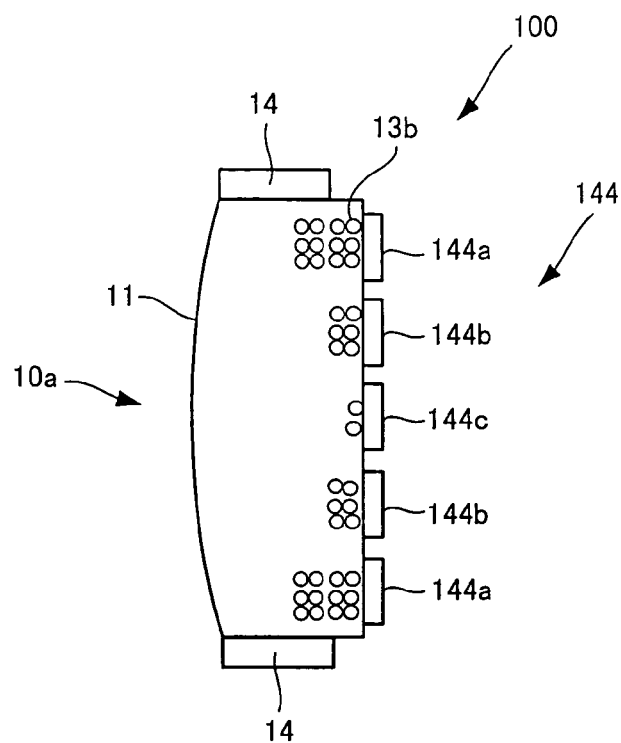
FIG. 21 is a diagram showing an example of-control of the refractive index of a lens body using an anode having the pattern of concentric-circle electrode elements.

FIG. 21 is a diagram showing an example of control of the refractive index of a lens body 100 using the pattern of concentric-circle electrode elements shown in part (b) of FIG. 20.

An anode 144 for attracting nanoparticles 13b is placed on a back surface in a light passage region 10a of a container 11 constituting the lens body 100. The anode 144 has a first concentric-circle electrode element 144a in the pattern and a second concentric-circle electrode element 144b in the pattern in order from the outer circumferential side. The anode 144 also has a circular electrode element 144c at a center. A voltage of a highest level is applied to the electrode element 144a in the pattern, a voltage of a lower level is applied to the electrode element 144b in the pattern, and a voltage of a lowest level is applied to the electrode element 144c in the pattern.

Since the highest voltage is applied to the electrode element 144a in the pattern, a large amount of nanoparticles 13b are attracted to the electrode element 144a in the pattern. Amounts of nanoparticles 13b according to the voltages applied to the electrode patterns 144b and 144c are respectively attracted to the electrode elements 144b and 144c. The distribution of nanoparticles 13b may be controlled according to the voltages applied to the electrode elements 144a, 144b and 144c of the anode 144 in the electrode pattern as described above.

In the pattern of electrode elements 141a in stripe form shown in part (a) of FIG. 20 as described above, lower to higher voltages may be applied to the electrode elements 141a in correspondence with the uppermost to lowermost positions to realize a variable-focus lens having a prism effect. Also, in the pattern of electrode elements 143a in matrix form shown in part (c) of FIG. 20, voltages selected as desired may be applied to the electrode elements 143a to realize a variable-focus lens for correcting ordinary lens aberrations.

Figure 22:
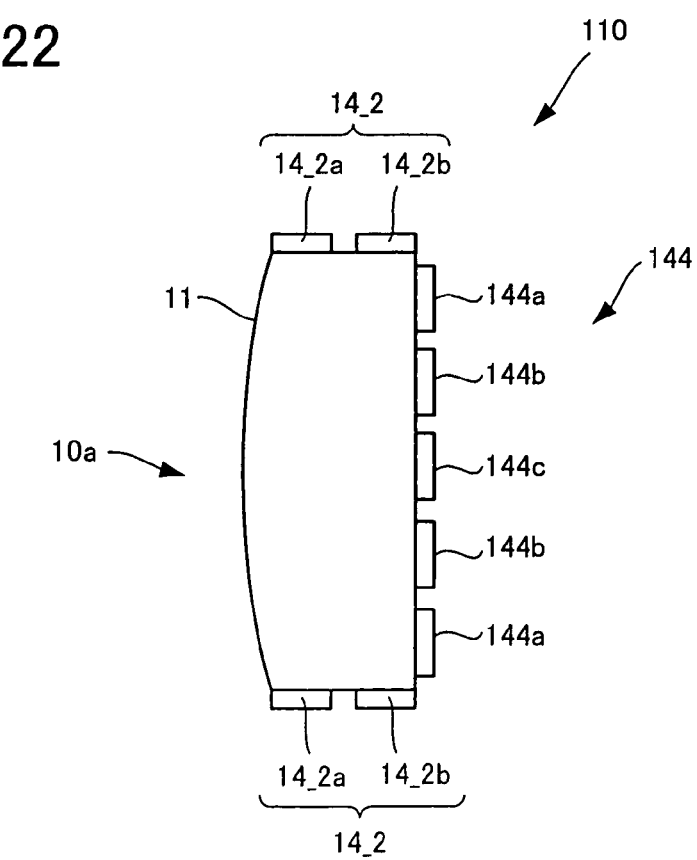
FIG. 22 is a diagram showing an example of the placement of a cathode having two electrode element patterns in such positions on a container constituting a lens body as to surround a light passage region.

FIG. 22 is a diagram showing an example of the placement of a cathode having two electrode element patterns in such positions on a container constituting a lens body as to surround a light passage region.

Referring to FIG. 22, a cathode 14_2 has two electrode elements 14_2a and 14_2b placed in such positions on a container 11 constituting a lens body 110 as to surround a light passage region 10a. The distribution of nanoparticles 13b may be freely controlled by applying desired voltages to the electrode elements 14_2a and 14_2b of the cathode 14_2 and applying desired voltages to electrode elements 144a, 144b and 144c of the anode 144.

Figure 23:
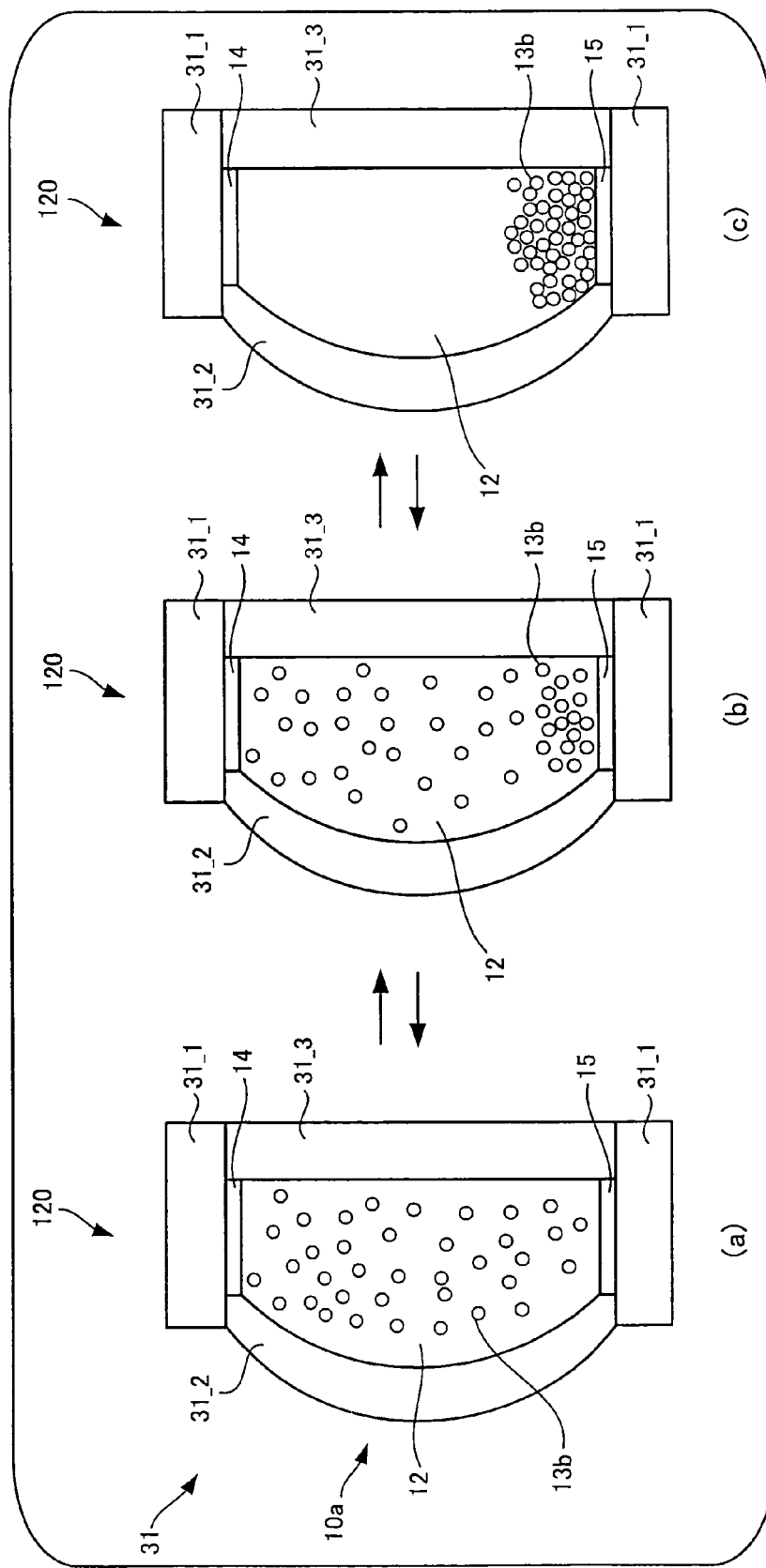
FIG. 23 is a diagram showing a state in which nanoparticles are moved in a dispersion medium in a lens body having the shape of a lens with a convex outer surface.

FIG. 23 is a diagram showing a state in which nanoparticles are moved in a dispersion medium in a lens body 120 having the shape of a lens with a convex outer surface.

The lens body 120 shown in FIG. 23 has a container 31 formed by a cylindrical member 31_1 placed so as to surround a cathode 14 and an anode 15, and members 31_2 and 31_3 which are fitted in front and rear surfaces of the member 31_1, and which are light transmissive. These members 31_1, 31_2, and 31_3 are formed of a plastic. Therefore, the container 31 can be realized as a lightweight container having high impact resistance.

Nanoparticles 13b negatively charged are uniformly dispersed in a dispersion medium 12, as shown in part (a) of FIG. 23. When a predetermined voltage is applied between the cathode 14 and the anode 15, the nanoparticles 13b uniformly dispersed in the dispersion medium 12 are gradually attracted to the side of anode 15, as shown in part (b) of FIG. 23. Finally, the greater part of the nanoparticles 13b dispersed in the dispersion medium 12 are attracted to the side of anode 15, as shown in part (c) of FIG. 23. The refractive index of the lens body 120 is thereby changed from a comparatively high value determined by the refractive index of the dispersion medium 12 and the nanoparticles 13b to a comparatively low value determined by the refractive index of the dispersion medium 12 only.

Figure 24:
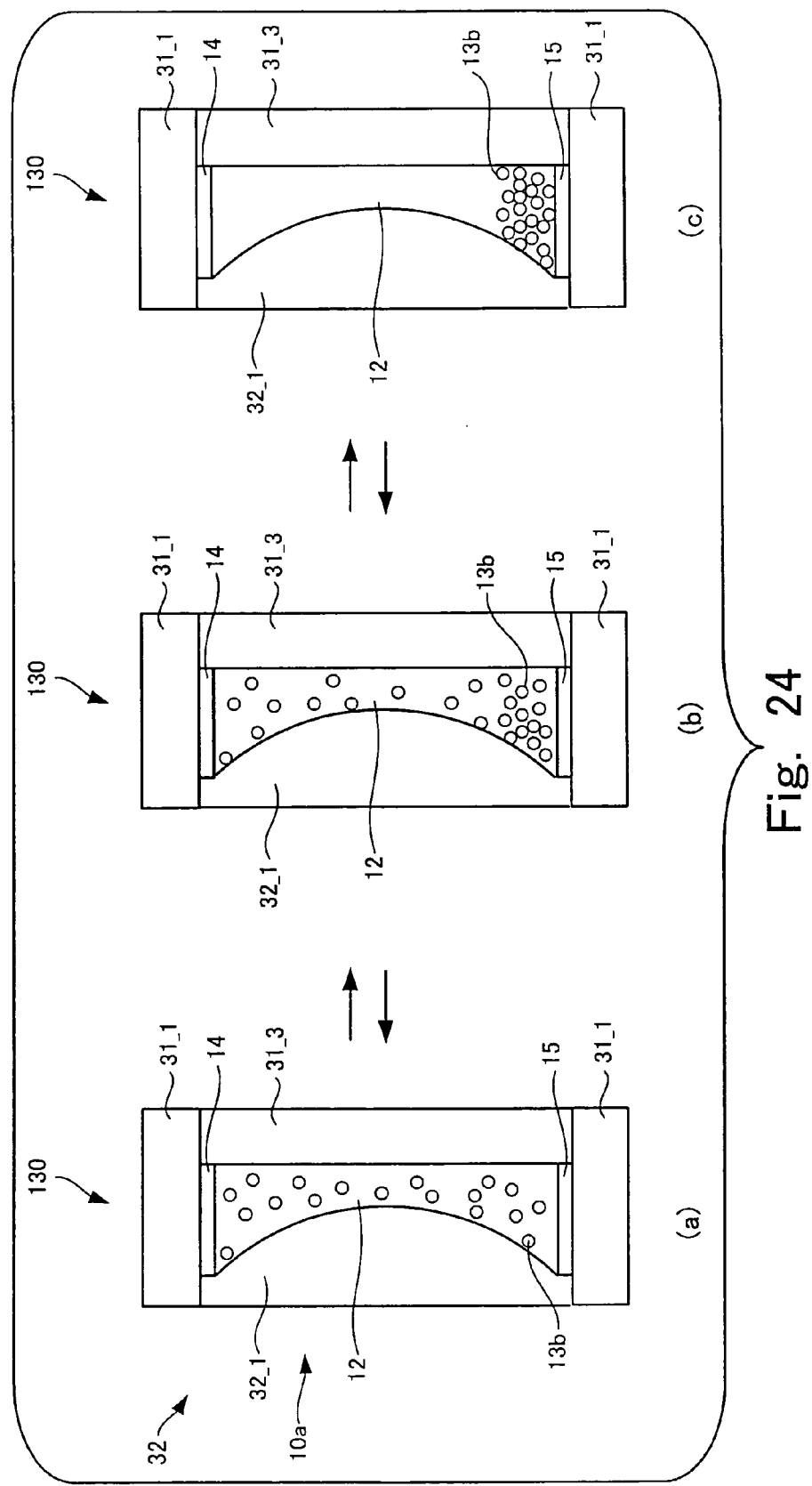
FIG. 24 is a diagram showing a state in which nanoparticles are moved in a dispersion medium in a lens body having the shape of a lens with a concave outer surface.

FIG. 24 is a diagram showing a state in which nanoparticles are moved in a dispersion medium in a lens body 130 having the shape of a lens with a concave outer surface.

The lens body 130 shown in FIG. 24 has a container 32 formed by a cylindrical member 31_1 placed so as to surround a cathode 14 and an anode 15, and members 32_1 and 31_3 which are fitted in front and rear surfaces of the member 31_1, and which are light transmissive. These members 31_1, 32_1, and 31_3 are formed of a plastic. Nanoparticles 13b negatively charged are uniformly dispersed in a dispersion medium 12, as shown in part (a) of FIG. 24.

When a predetermined voltage is applied between the cathode 14 and the anode 15, the nanoparticles 13b uniformly dispersed in the dispersion medium 12 are gradually attracted to the side of anode 15, as shown in part (b) of FIG. 24. Finally, the greater part of the nanoparticles 13b dispersed in the dispersion medium 12 are attracted to the side of anode 15, as shown in part (c) of FIG. 24. The refractive index of the lens body 130 is thereby changed from a comparatively high value determined by the refractive index of the dispersion medium 12 and the nanoparticles 13b to a comparatively low value determined by the refractive index of the dispersion medium 12 only.

Figure 25:
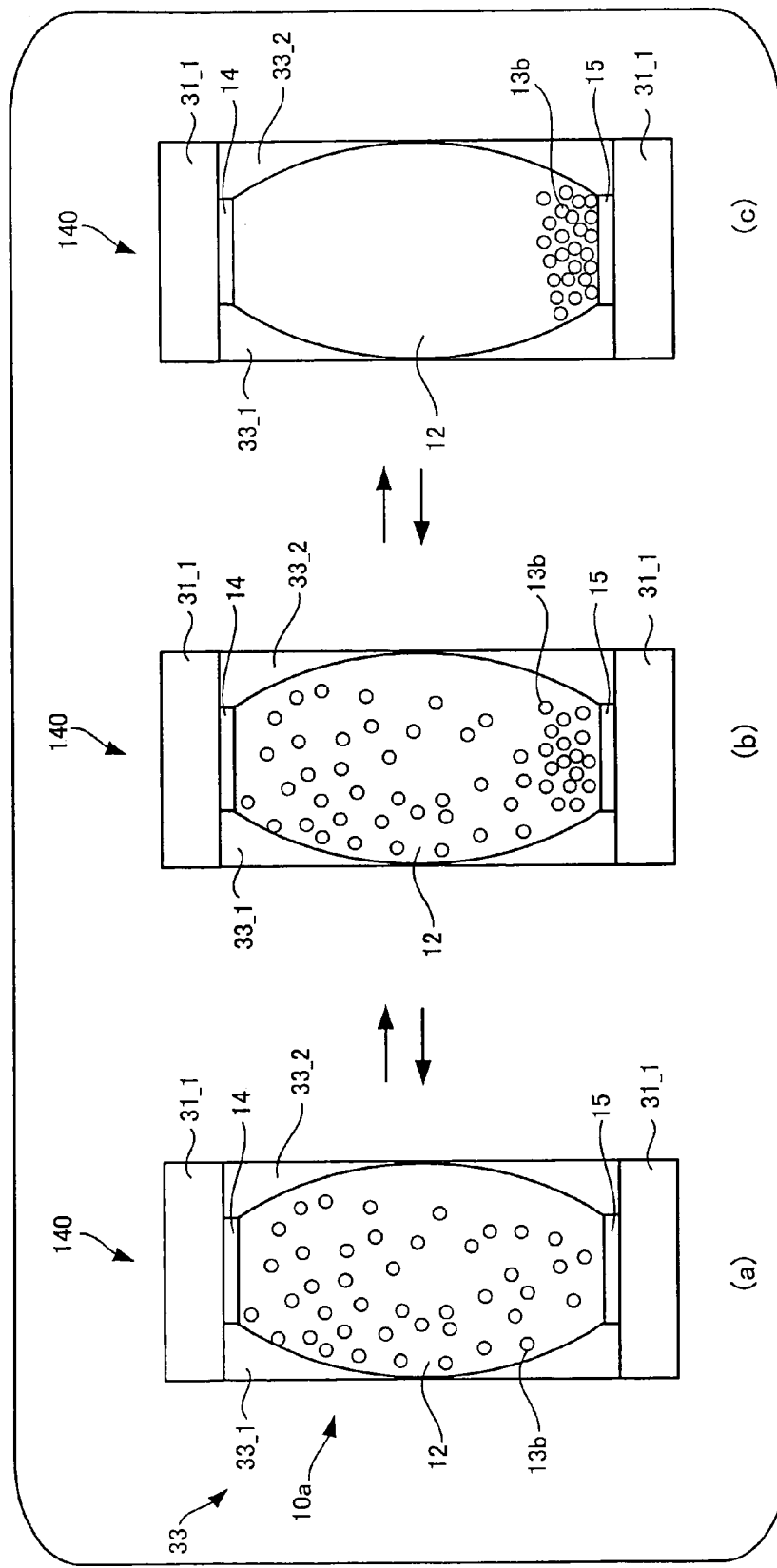
FIG. 25 is a diagram showing a state in which nanoparticles are moved in a dispersion medium in a lens body having the shape of a lens with two convex outer surfaces.

FIG. 25 is a diagram showing a state in which nanoparticles are moved in a dispersion medium in a lens body 140 having the shape of a lens with two convex outer surfaces.

The lens body 140 shown in FIG. 25 has a container 33 formed by a cylindrical member 31_1 placed so as to surround a cathode 14 and an anode 15, and members 33_1 and 33_2 which are fitted in front and rear surfaces of the member 31_1, and which are light transmissive. These members 31_1, 33_1, and 33_2 are formed of a plastic. Nanoparticles 13b negatively charged are uniformly dispersed in a dispersion medium 12, as shown in part (a) of FIG. 25. When a predetermined voltage is applied between the cathode 14 and the anode 15, the nanoparticles 13b uniformly dispersed in the dispersion medium 12 are gradually attracted to the side of anode 15, as shown in part (b) of FIG. 25. Finally, the greater part of the nanoparticles 13b dispersed in the dispersion medium 12 are attracted to the side of anode 15, as shown in part (c) of FIG. 25. The refractive index of the lens body 140 is thereby changed from a comparatively high value determined by the refractive index of the dispersion medium 12 and the nanoparticles 13b to a comparatively low value determined by the refractive index of the dispersion medium 12 only.

Figure 26:
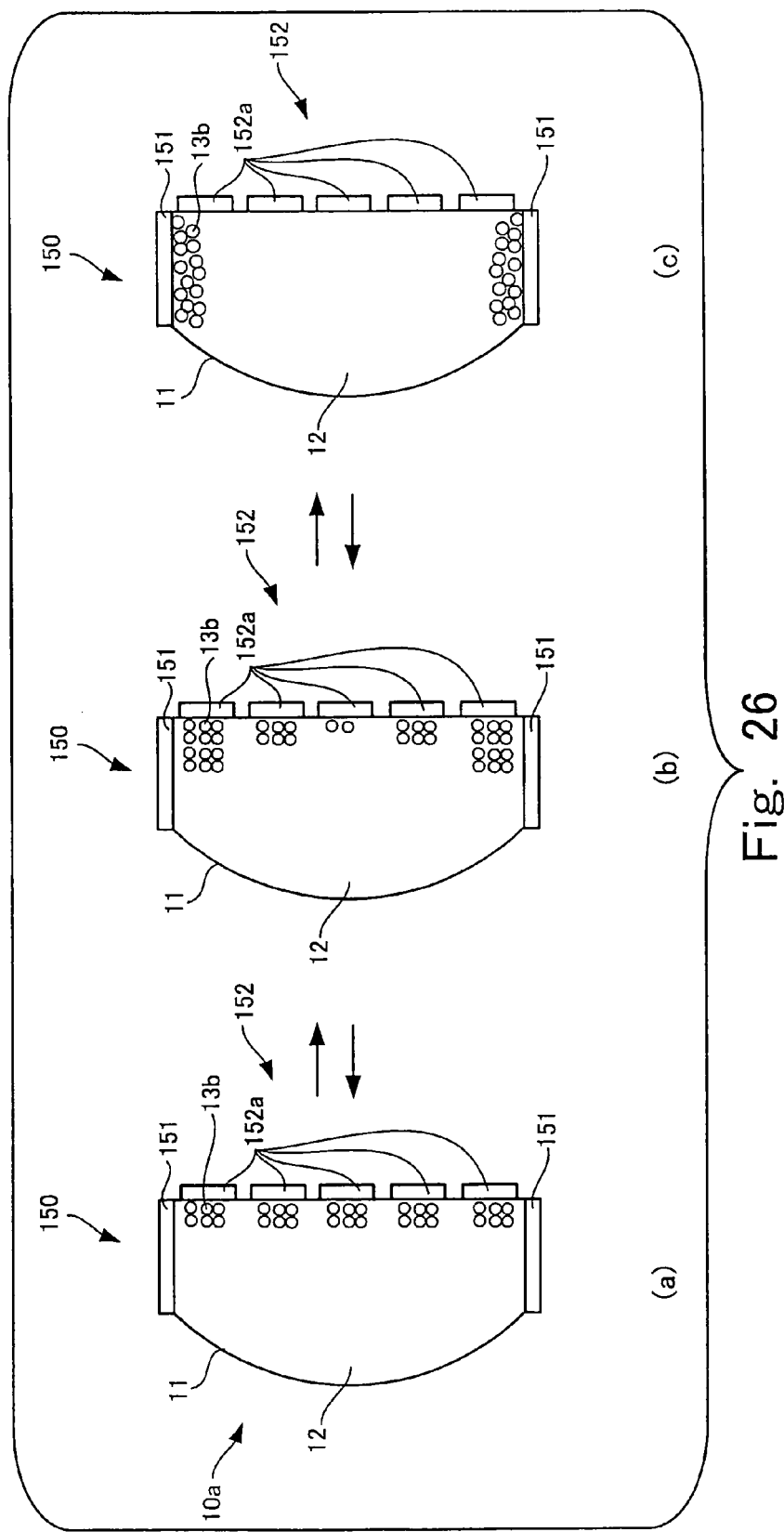
FIG. 26 is a diagram showing a sectional configuration of a lens body provided with electrodes to which positive and negative voltages are applied as desired, and having the shape of a lens with a convex outer surface.

FIG. 26 is a diagram showing a sectional configuration of a lens body 150 provided with electrodes to which positive and negative voltages are applied as desired, and having the shape of a lens having a convex outer surface.

A first electrode 151 is placed in such a position on a container 11 constituting the lens body 150 as to surround a light passage region 10a. A second electrode 152 formed of a certain number of electrode elements 152a is placed on a back surface of the container 11 in the light passage region 10a. Further, negative nanoparticles 13b are dispersed in a dispersion medium 12.

When a negative voltage and a positive voltage are respectively applied to the first and second electrodes 151 and 152, the first and second electrodes 151 and 152 function as a cathode and an anode, respectively. When a positive voltage and a negative voltage are respectively applied to the first and second electrodes 151 and 152, the first and second electrodes 151 and 152 function as an anode and a cathode, respectively.

If a negative voltage and a positive voltage are respectively applied to the first and second electrodes 151 and 152 in the lens body 150 shown in part (a) of FIG. 26, then the first and second electrodes 151 and 152 function as a cathode and an anode, respectively. It is assumed here that the positive voltages applied to the electrode elements 152a constituting the second electrode 152 are equal to each other. Accordingly, in this case, equal amounts of nanoparticles 13b are respectively attracted to the electrode elements 152a.

If a positive voltage of a highest level is applied to the electrode elements 152a at the opposite ends in the electrode elements constituting the second electrode 152; a positive voltage of a lowest level is applied to the central electrode 152a; and a positive voltage of a medium level is applied to the electrode elements 152a positioned between the electrode elements 152a at the opposite ends and the central electrode element 152a, then the largest amount of nanoparticles 13b, the smallest amount of nanoparticles 13b and a medium amount of nanoparticles 13b are respectively attracted to the electrode elements 152a at the opposite ends, the central electrode element 152a and the electrode elements 152a positioned between the electrode elements 152a at the opposite ends and the central electrode element 152a, as shown in part (b) of FIG. 26.

Further, if a positive voltage and a negative voltage are respectively applied to the first and second electrodes 151 and 152, then the first and second electrodes 151 and 152 function as an anode and a cathode, respectively, and nanoparticles 13b are attracted to the first electrode 151, as shown in part (c) of FIG. 26. The distribution of nanoparticles 13*b* may be controlled in this way.

Figure 27:
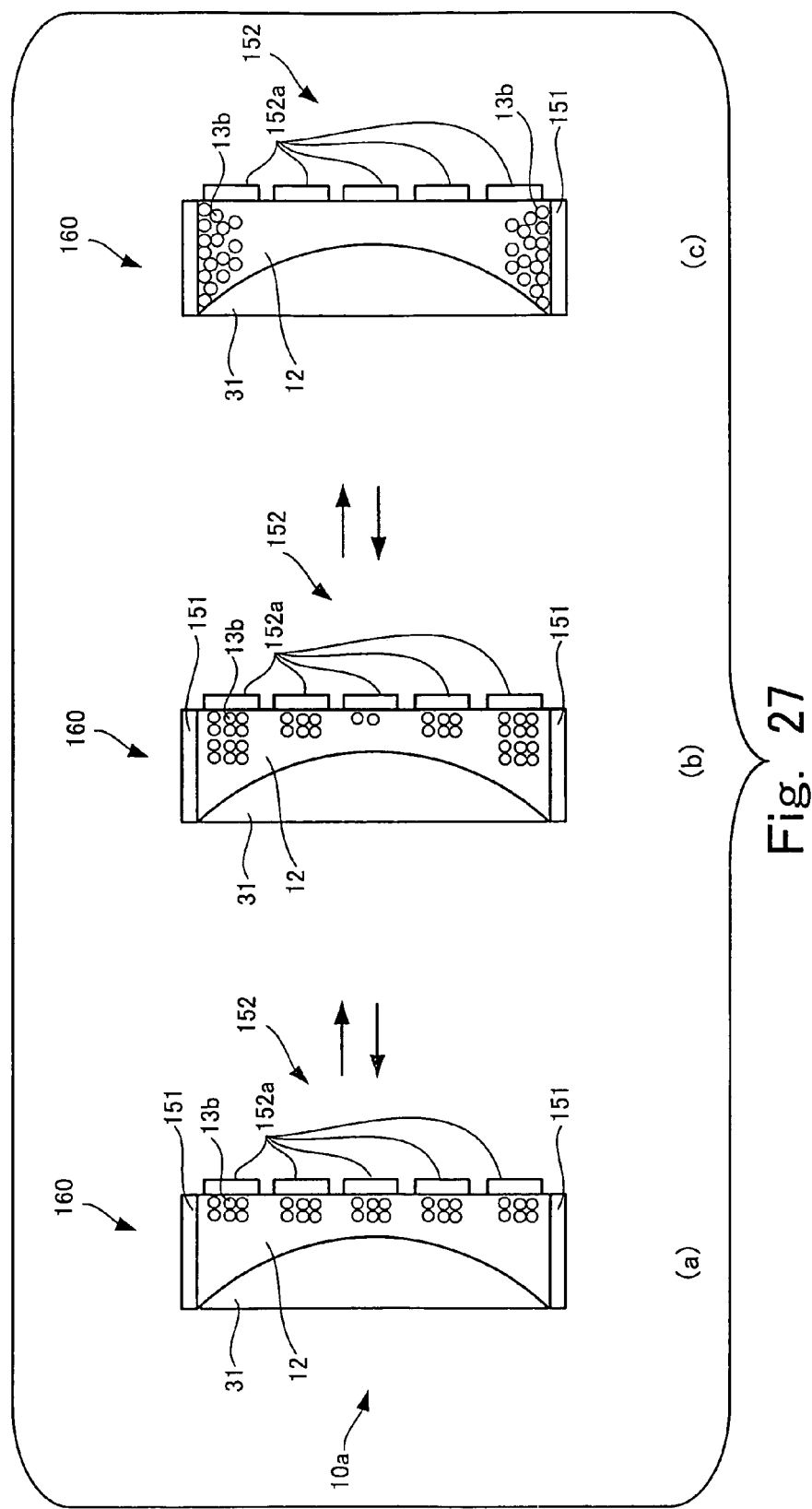
FIG. 27 is a diagram showing a sectional configuration of a lens body provided with electrodes to which positive and negative voltages are applied as desired, and having the shape of a lens with a concave outer surface.

FIG. 27 is a diagram showing a sectional configuration of a lens body 160 provided with electrodes to which positive and negative voltages are applied as desired, and having the shape of a lens having a concave outer surface.

A first electrode 151 is placed in such a position on a container 31 constituting the lens body 160 as to surround a light passage region 10*a*. A second electrode 152 formed of a certain number of electrode elements 152*a* is placed on a back surface of the container 31 in the light passage region 10*a*. Further, negative nanoparticles 13*b* are dispersed in a dispersion medium 12.

In the lens body 160 shown in part (a) of FIG. 27, a negative voltage and a positive voltage are respectively applied to the first and second electrodes 151 and 152. It is assumed here that the positive voltages applied to the electrode elements 152*a* constituting the second electrode 152 are equal to each other. Under these conditions, equal amounts of nanoparticles 13*b* are respectively attracted to the electrode elements 152*a*.

In a case shown in part (b) of FIG. 27, a positive voltage of a highest level is applied to the electrode elements 152*a* at the opposite ends in the electrode elements constituting the second electrode 152; a positive voltage of a lowest level is applied to the central electrode 152*a*; and a positive voltage of a medium level is applied to the electrode elements 152*a* positioned between the electrode elements 152*a* at the opposite ends and the central electrode element 152*a*. In this case, the largest amount of nanoparticles 13*b*, the smallest amount of nanoparticles 13*b* and a medium amount of nanoparticles 13*b* are respectively attracted to the electrode elements 152*a* at the opposite ends, the central electrode element 152*a* and the electrode elements 152*a* positioned between the electrode elements 152*a* at the opposite ends and the central electrode element 152*a*.

In a case shown in part (c) of FIG. 27, a positive voltage and a negative voltage are respectively applied to the first and second electrodes 151 and 152. In this case, the first and second electrodes 151 and 152 function as an anode and a cathode, respectively, and nanoparticles 13*b* are attracted to the first electrode 151.

Figure 28:
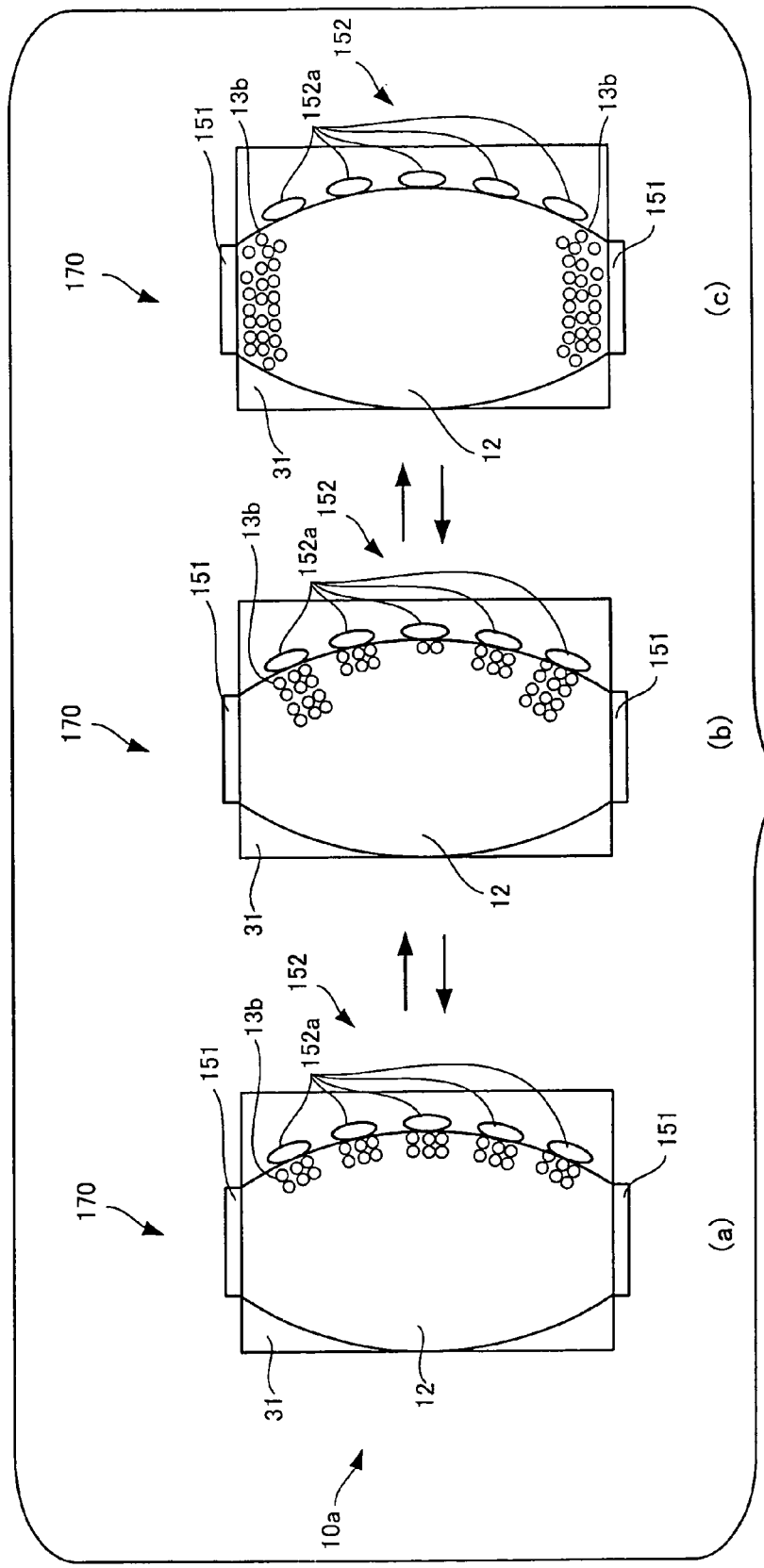
FIG. 28 is a diagram showing a sectional configuration of a lens body provided with electrodes to which positive and negative voltages are applied as desired, and having the shape of a lens with two convex outer surfaces.

FIG. 28 is a diagram showing a sectional configuration of a lens body 170 provided with electrodes to which positive and negative voltages are applied as desired, and having the shape of a lens having two convex outer surfaces.

In the lens body 170 shown in part (a) of FIG. 28, a negative voltage and a positive voltage are respectively applied to the first and second electrodes 151 and 152. It is assumed here that the positive voltages applied to the electrode elements 152*a* constituting the second electrode 152 are equal to each other. Under these conditions, equal amounts of nanoparticles 13*b* are respectively attracted to the electrode elements 152*a*.

In a case shown in part (b) of FIG. 28, a positive voltage of a highest level is applied to the electrode elements 152*a* at the opposite ends in the electrode elements constituting the second electrode 152; a positive voltage of a lowest level is applied to the central electrode 152*a*; and a positive voltage of a medium level is applied to the electrode elements 152*a* positioned between the electrode elements 152*a* at the opposite ends and the central electrode element 152*a*. In this case, the largest amount of nanoparticles 13*b*, the smallest amount of nanoparticles 13*b* and a medium amount of nanoparticles 13*b* are respectively attracted to the electrode elements 152*a* at the opposite ends, the central electrode element 152*a* and the electrode elements 152*a* positioned between the electrode elements 152*a* at the opposite ends and the central electrode element 152*a*.

In a case shown in part (c) of FIG. 28, a positive voltage and a negative voltage are respectively applied to the first and second electrodes 151 and 152. In this case, the first and second electrodes 151 and 152 function as an anode and a cathode, respectively, and nanoparticles 13*b* are attracted to the first electrode 151.

Figure 29:
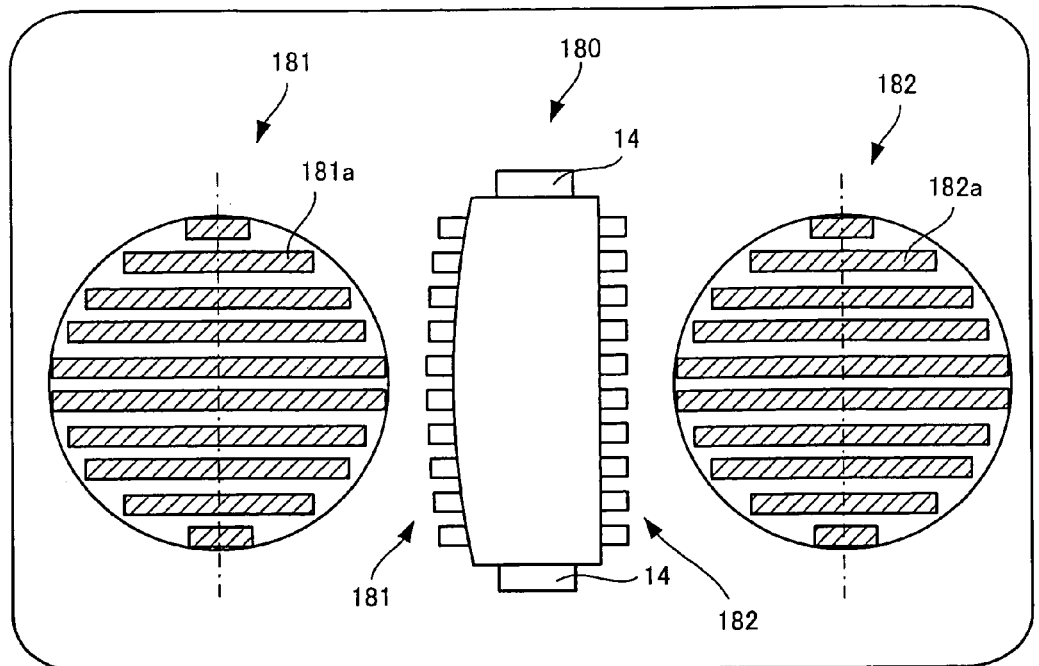
FIG. 29 is a diagram showing a sectional configuration of a first lens body having a devised electrode pattern.

FIG. 29 is a diagram showing a sectional configuration of a first lens body 180 having a devised electrode pattern.

In the lens body 180 shown in FIG. 29, a cathode 14 is placed in such a position on a container as to surround a light passage region. In the lens body 180, an anode 181 having a pattern of electrode elements 181*a* in the form of horizontal stripes is placed on a front surface of the container in a light passage region 10*a*. Further, in the lens body 180, an anode 182 having a pattern of electrode elements 182*a* in the form of horizontal stripes is placed on a back surface of the container in the light passage region. Since in the lens body 180 the patterns of the electrode elements 181*a* and 182*a* of the anodes 181 and 182 are symmetrical, a prism effect can be realized by applying voltages such that the voltage value is gradually reduced (or increased) from the top to the bottom of the electrode patterns 181*a* and 182*a*. The thus-constructed lens body 180 may be provided in a camera together with an acceleration sensor for camera shake correction to perform vertical camera shake correction of a lens provided in the camera according to a signal from the acceleration sensor. Also, the thus-constructed lens body 180 may be provided in a viewfinder of a camera to make parallax correction.

Figure 30:
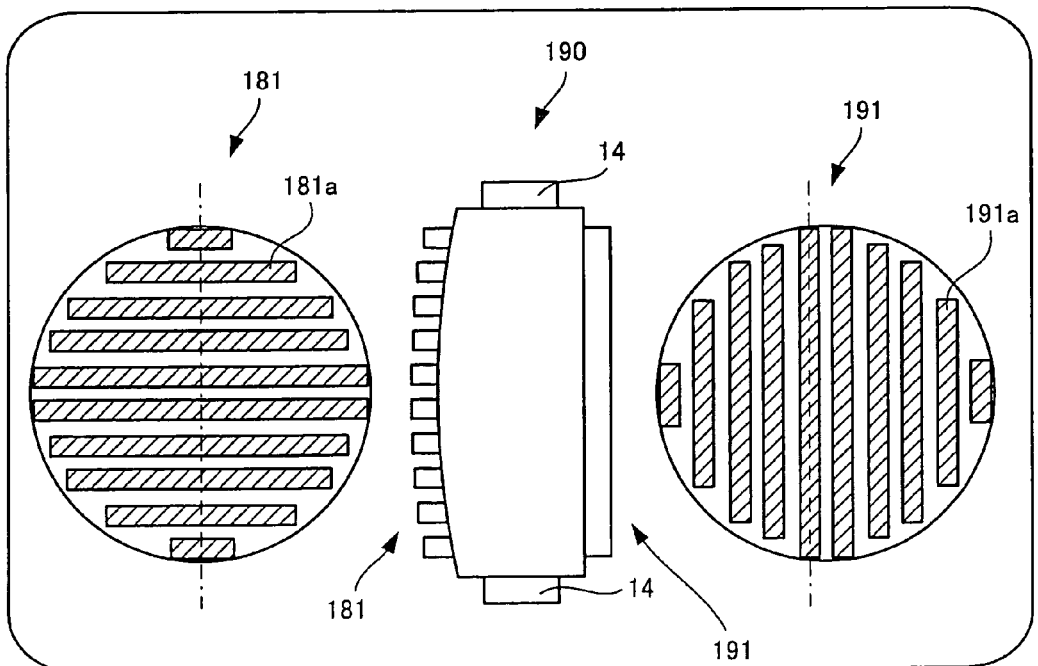
FIG. 30 is a diagram showing a sectional configuration of a second lens body having a devised electrode pattern.

FIG. 30 is a diagram showing a sectional configuration of a second lens body 190 having a devised electrode pattern.

The lens body 190 shown in FIG. 30 differs from the lens body 180 shown in FIG. 29 in that an anode 191 having a pattern of electrode elements 191*a* in the form of vertical stripes is provided in place of the anode 182 having the pattern of electrode elements 182*a* in the form of horizontal stripes. Camera shake correction and parallax correction along the vertical and horizontal directions of a lens may be performed by controlling the refractive index in the vertical direction by means of the electrode element pattern 181*a* and controlling the refractive index in the horizontal direction by means of the electrode element pattern 191*a*.

Figure 31:
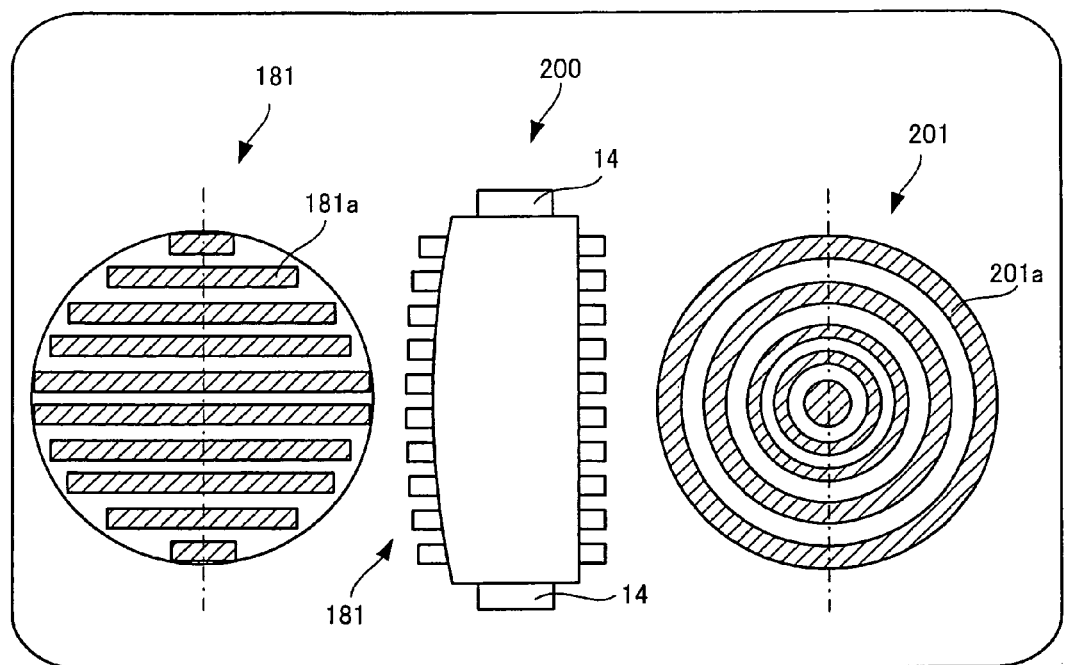
FIG. 31 is a diagram showing a sectional configuration of a third lens body having a devised electrode pattern.

FIG. 31 is a diagram showing a sectional configuration of a third lens body 200 having a devised electrode pattern.

The lens body 200 shown in FIG. 31 differs from the lens body 190 shown in FIG. 30 in that an anode 201 having a pattern of electrode elements 201*a* in the form of concentric circles is provided in place of the anode 191 having a pattern of electrode elements 191*a* in the form of vertical stripes. An image-taking lens using one lens body 200 for camera shake correction and for focusing may be implemented by realizing a convex lens by means of the electrode element pattern 201*a* and by realizing a prism effect by means of the electrode element pattern 181*a*. Also, this lens body 200 may be used in a viewfinder optical system of a camera having a zoom lens to realize a zoom finder capable of changing according to the field of view changed by the zoom lens. Further, the same anode as the anode 201 having the pattern of concentric-circle electrode elements 201*a* may be provided in place of the anode 181 having the pattern of electrode elements 181*a* in the form of horizontal stripes. This anode and the anode 201 enable nanoparticles to move rapidly in the case of increasing the positive refractive power for example.

Figure 32:
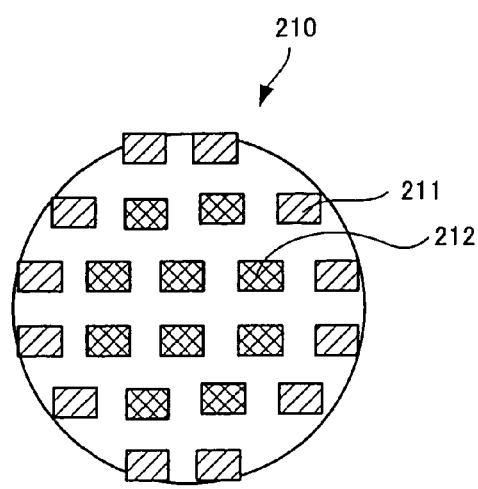
FIG. 32 is a diagram showing an example of an anode having an electrode pattern in matrix form.

FIG. 32 is a diagram showing an anode having a pattern of electrode elements in matrix form.

An electrode 210 shown in FIG. 32 has a pattern of electrode elements 211 placed in a peripheral region and a pattern of electrode elements 212 in matrix form placed in a central region. The electrode elements 211 placed in a peripheral region function as a cathode, while the electrode elements 212 placed in a central region function as an anode. A lens body having this electrode 210 may be placed adjacent to an ordinary lens, and an aberration of the lens may be corrected as described below. An aberration correction table formed of data for correcting an aberration of the lens is prepared and the distribution of nanoparticles is controlled by applying the voltage to the electrode 210 according to the data in the aberration correction table. The refractive index of the lens body is thereby controlled so that the aberration of the lens is corrected.

The lens bodies in which electrophoresis of a dispersoid dispersed in a dispersion medium is effected to control the focal length have been described. Description will now be made of a lens body in which magnetophoresis of a magnetic dispersoid dispersed in a dispersion medium is effected to control the focal length.

Figure 33:
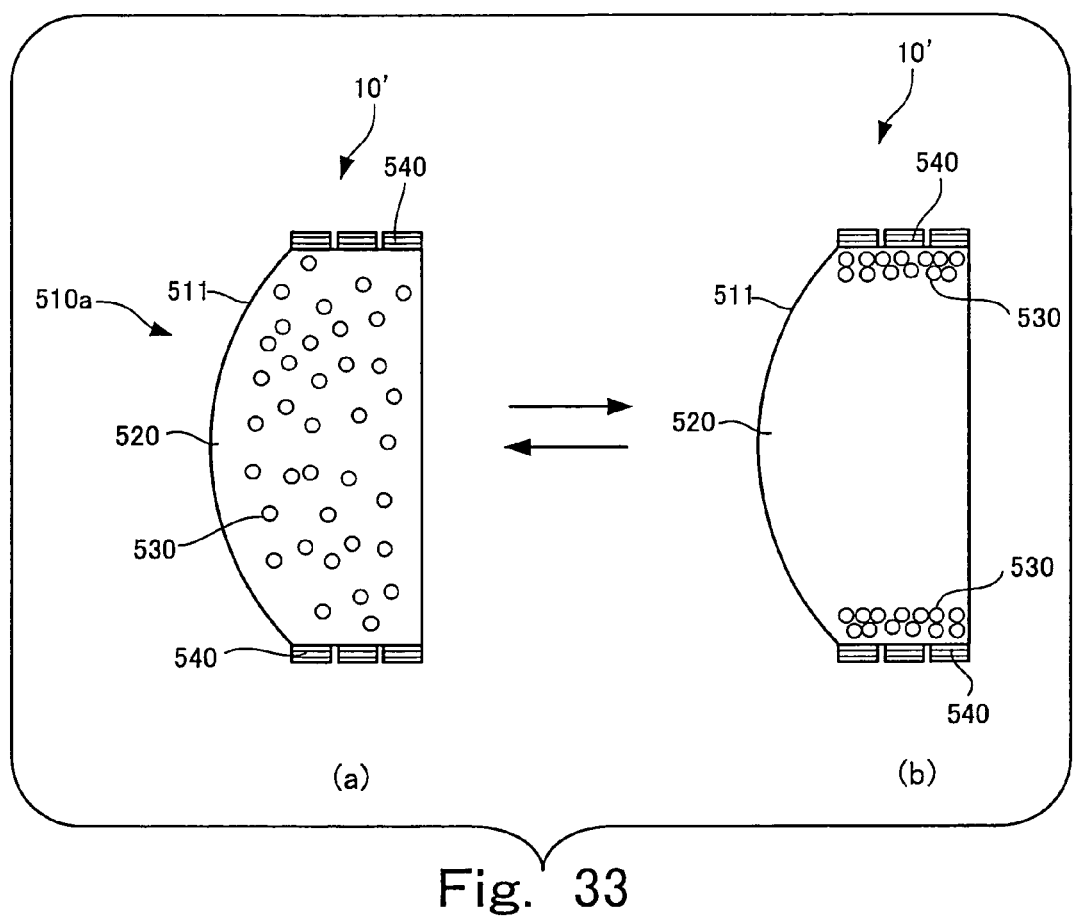
FIG. 33 is a diagram showing a sectional configuration of a lens body in which magnetophoresis of a dispersoid is caused to change the refraction of light.

FIG. 33 is a diagram showing a sectional configuration of a lens body 10' in which the diffraction of light is controlled by effecting magnetophoresis of a dispersoid.

The lens body 10' shown in FIG. 33 has the shape of a lens, as does the container 11 of the lens body 10 shown in FIG. 3, and has a transparent dispersion medium 520 and transparent magnetic nanoparticles 530 enclosed in a container 511 which is light-transmissive at least in a light passage region 510a. As the dispersion medium 520, the same fluid as the dispersion medium 12 in the lens body 10 shown in FIG. 3 can be used. As the material of the transparent magnetic nanoparticles 530, titanium-cobalt dioxide or the like can be used.

Coils 540 for generating magnetic fields for causing magnetophoresis of magnetic nanoparticles 530 are provided on upper and lower surface of the container 511 in place of the electrodes (cathode 14 and anode 15) of the lens body 10 shown in FIG. 3. The coils 540 are an example of the electromagnetic field generator in accordance with the present invention and correspond to the magnetic field generator in accordance with the present invention.

Figure 34:
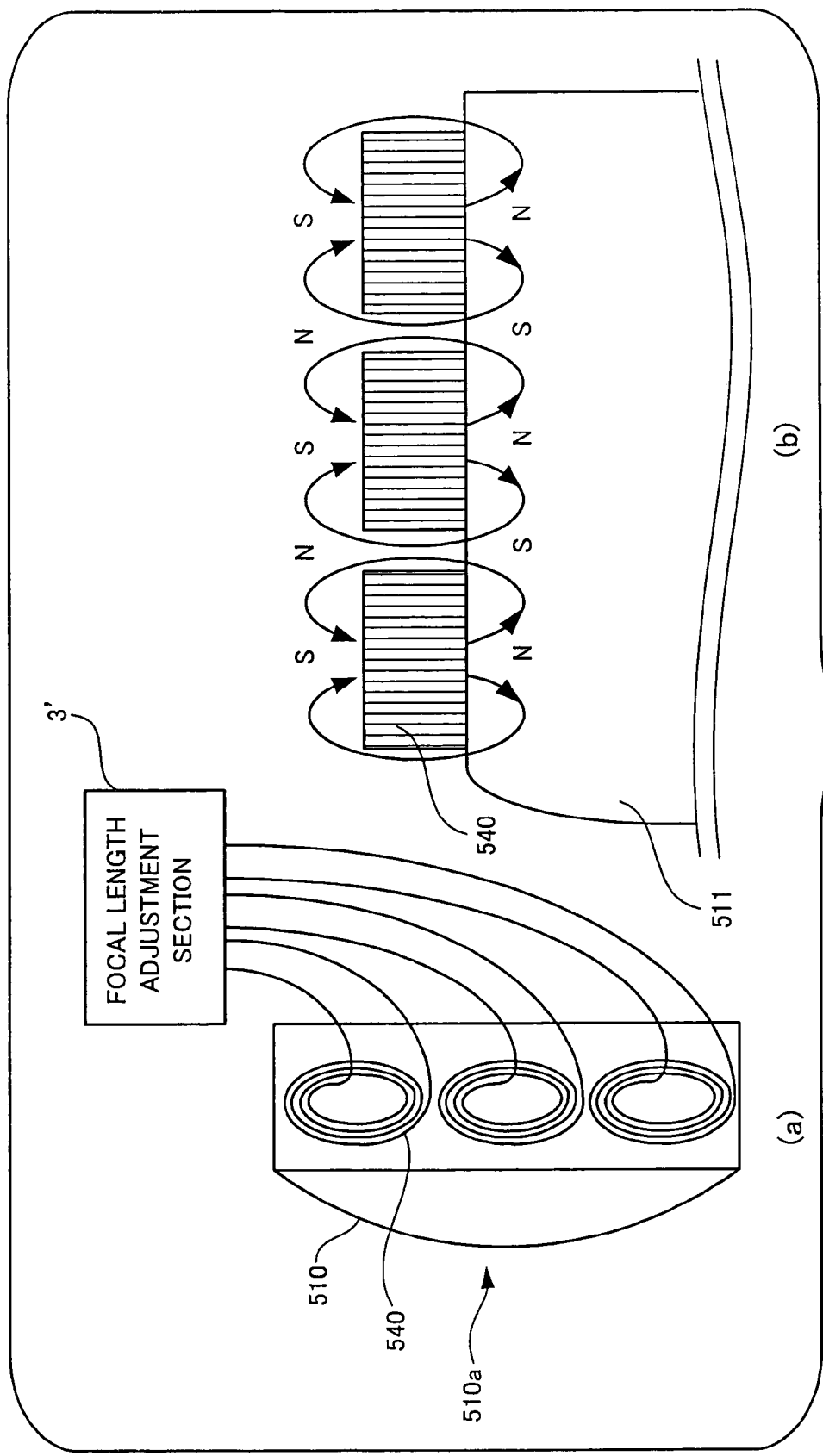
FIG. 34 is a diagram schematically showing the structure of the lens body 10' shown in FIG. 33.

FIG. 34 is a diagram schematically showing the structure of the lens body 10' shown in FIG. 33.

Part (a) of FIG. 34 shows a top view of the lens body 10'.

Three wound coils 540 are placed side by side on upper and lower surfaces of the container 511. A focal length adjustment section 3' which controls magnetic fields generated from the coils 540 by causing currents to flow through the coils 540 is provided in place of the focal length adjustment section 3 shown in FIG. 3 and connected to the coils 540. The focal length adjustment section 3' corresponds to an example of the focal length adjustment section in accordance with the present invention.

Part (b) of FIG. 34 shows an enlarged view of the coils 540 and a portion of the lens body 10' in the vicinity of the coils 540.

For example, the focal length adjustment section 3' supplies currents to the three coils 540 in the same direction. Magnetic fields are thereby generated through the three coils 540. Magnetic fields in which north and south poles are alternately arranged are thereby applied to the container 511, as shown in part (b) of FIG. 34. The polarity of each of the magnetic fields applied from the coils 540 to the container 511 for magnetophoresis of magnetic nanoparticles 530 may be either of the north pole and the south pole. Also, the directions of the currents supplied to the three coils 540 may be different from each other. The magnitudes of the magnetic fields applied to the container 511 and the regions through which the magnetic fields are applied can be accurately controlled by individually adjusting the directions and magnitudes of the currents supplied to the three coils 540.

A further description will be made by referring again to FIG. 33.

When no magnetic fields are generated by the coils 540, the magnetic nanoparticles 530 are uniformly dispersed in the dispersion medium 520, as shown in part (a) of FIG. 33.

When currents are supplied to the coils 540 by the focal length adjustment section 3' shown in part (a) of FIG. 34, magnetic fields according to the directions and magnitudes of the supplied currents are generated by the coils 540. The magnetic nanoparticles 530 uniformly dispersed in the dispersion medium 520 are attracted by the magnetic forces of the coils 540 to reduce the refractive index of the lens body 10', as shown in part (b) of FIG. 33.

Thus, the refraction of light passing through the lens body 10' can be controlled by effecting magnetophoresis of the dispersoid dispersed in the dispersion medium instead of electrophoresis.

The magnetophoretic lens body may have any of the various lens body shapes described above. If plural small coils are placed in a stripe pattern, a magnetic field pattern similar to the electric field pattern in the case of use of the cathode 141 shown in part (a) of FIG. 20 can be formed. If plural coils differing in size are placed on concentric circles, a magnetic field pattern similar to the electric field pattern in the case of use of the cathode 142 shown in part (b) of FIG. 20 can be formed. If small coils are arranged in matrix form, a magnetic field pattern similar to the electric field pattern in the case of use of the cathode 143 shown in part (c) of FIG. 20 can be formed.

While the coils capable of generating magnetic fields when supplied with currents have been described as an example of the magnetic field generator in accordance with the present invention, the magnetic field generator in accordance with the present invention may use a permanent magnet which generates a magnetic field by itself. In such a case, magnetophoresis of the dispersoid is realized by moving the permanent magnet.

Basic embodiments for implementation of the concept of the present invention have been described. For practical use of an optical element provided as the lens body used in the present invention, however, it is preferable to prevent foreign materials or water droplets from being attached to a portion on the optical path to cause a deterioration of the lens performance.

For example, it is preferable to apply a water-repellent film on an external surface intersecting the optical path of the container containing a fluid (which surface hereinafter referred to as "light-transmissive surface"). If the light-transmissive surface is given water repellency, attachment of foreign materials and water droplets or the like is prevented and high transmissivity of the optical element can be maintained. As a material constituting this water-repellent coating, a silicone resin, a block copolymer of organopolysiloxane, a fluorine-based polymer, polytetrafluoroethane and the like are preferred.

It is also preferable to apply a hydrophilic film on the light-transmissive surface of the container constituting the lens body. Attachment of foreign materials to the light-transmissive surface can also be prevented by giving a hydrophilicity and oil repellency to the light-transmissive surface. As the hydrophilic film, a film formed of an acrylate polymer, a film coated with a surfactant such as a nonionic organosilicone-based surfactant and the like are preferred. As a method of making the hydrophilic film, plasma polymerization of a silane monomer, ion beam processing or the like may be used.

It is also preferable to apply a photocatalyst such as titanium oxide on the light-transmissive surface of the container constituting the lens body. The photocatalyst reacting with light decomposes a contamination or the like to keep the light-transmissive surface clean.

Further, it is preferable to apply an antistatic film on the light-transmissive surface of the container constituting the lens body. If static electricity is accumulated on the light-transmissive surface of the container, or if the light-transmissive surface is charged through the electrodes, there is a possibility of foreign materials and-dust sticking to the light-transmissive surface. Attachment of such unnecessary materials can be prevented by applying an antistatic film on the light-transmissive surface. The light-transmissivity of the lens body is thereby maintained. Preferably, the antistatic film is formed of a polymer alloy-based material. Particularly preferably, the polymer alloy-based material is a polyether-based material, a polyether ester amide-based material, a material having a cationic group, or Reolex (commercial name, DAI-ICHI KOGYO SEIYAKU CO. , LTD. ). Preferably, the antistatic film is made by a mist method.

An antifouling material may be used for the container constituting the lens body. A fluororesin is preferred as the antifouling material. More specifically, a fluorine-containing alkyl alkoxysilane compound, a fluoroalkyl group-containing polymer or oligomer and the like are preferred. One having a functional group crosslinkable to the above-mentioned curable resin is particularly preferred. Preferably, the amount of addition of the antifouling material is set to the minimum necessary amount for the desired antifouling effect.

Figure 35:
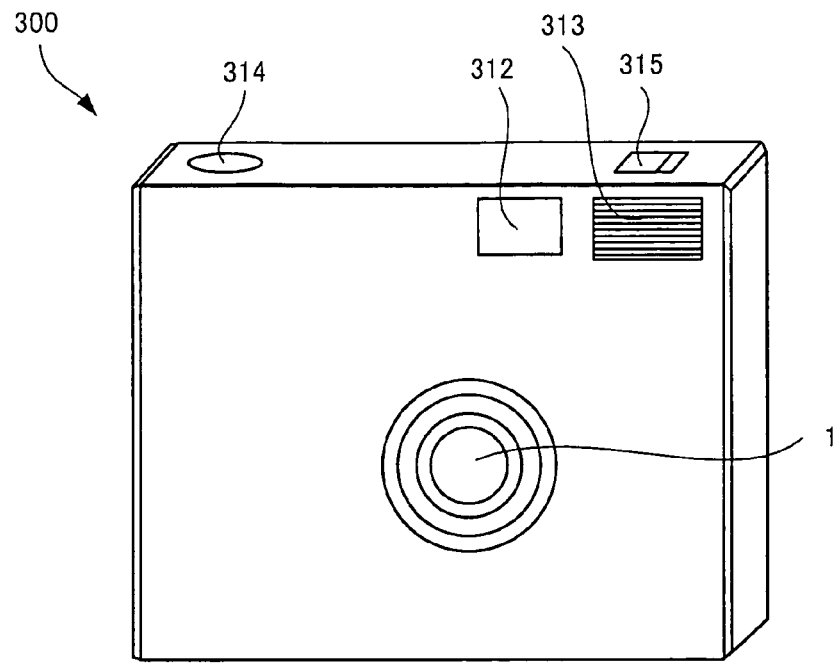
FIG. 35 is a front perspective view obliquely from above of an external appearance of a digital camera which is a first embodiment of an image taking apparatus in accordance with the present invention.
Figure 36:
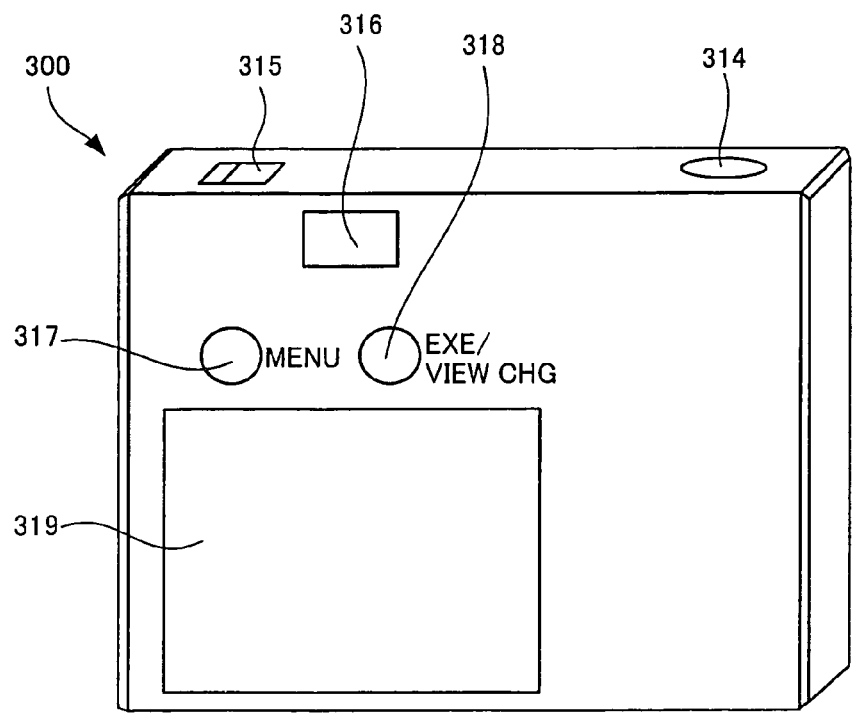
FIG. 36 is a rear perspective view obliquely from above of an external appearance of the digital camera shown in FIG. 35.

FIG. 35 is a front perspective view obliquely from above of an external appearance of a digital camera 300 which is a first embodiment of an image taking apparatus in accordance with the present invention. FIG. 36 is a rear perspective view obliquely from above of an external appearance of the digital camera shown in FIG. 35.

As shown in FIG. 35, the above-described variable-focus lens 1 shown in FIG. 1 is provided in a central front portion of the digital camera 300. An optical finder objective window 312 and an auxiliary light emitting section 313 are provided in upper front portions of the digital camera 300. A shutter button 314 and a slide-type power switch 315 are provided in upper surface portions of the digital camera 300.

Further, an optical finder ocular window 316, a menu switch 317, an execution/view change switch 318 and an image monitor 319 are provided in rear surface portions of the digital camera 300, as shown in FIG. 36.

Figure 37:
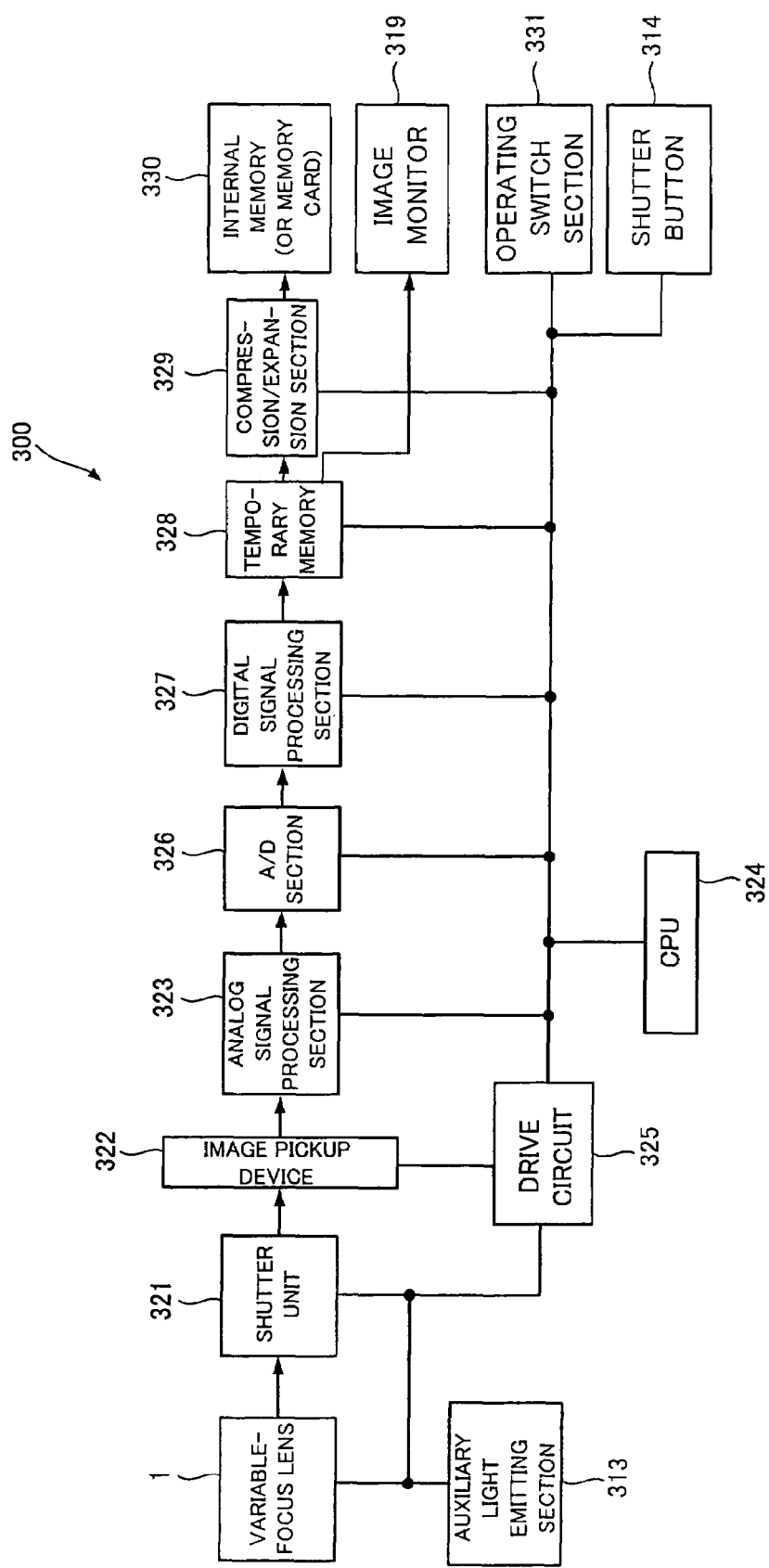
FIG. 37 is a block diagram showing a circuit configuration of the digital camera shown in FIG. 35.
Figure 38:
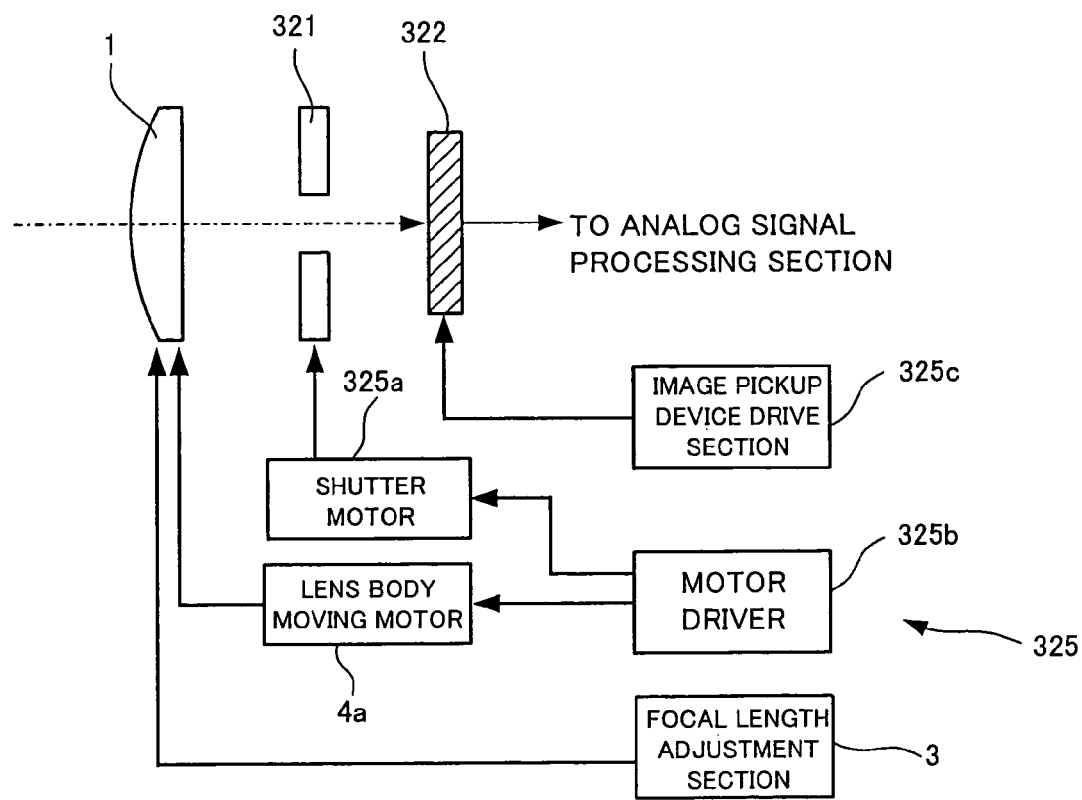
FIG. 38 is a diagram showing the placement and configuration of an image taking lens, a shutter unit, an image pickup device and a drive circuit.

FIG. 37 is a block diagram showing a circuit configuration of the digital camera shown in FIG. 35. FIG. 38 is a diagram showing the placement and configuration of a variable-focus lens 1, a shutter unit 321, an image pickup device 322 and a drive circuit 325 shown in FIG. 37.

The digital camera 300 shown in FIG. 37 has the variable-focus lens 1 and the auxiliary light emitting section 313. The digital camera 300 also has the shutter unit 321, the image pickup device (CCD) 322, an analog signal processing section 323, a CPU 324 for performing overall control of the digital camera 300, the drive circuit 325, and an analog/digital (AD) section 326. The drive circuit 325 has, as described below in detail, a lens body moving motor 4a constituting the moving mechanism 4 for moving the lens body 10 in the optical axis direction, a shutter motor 325a for driving the shutter unit 321, a motor driver 325b for applying voltages to the lens body moving motor 4a and the shutter motor 325b, and an image pickup device drive section 325c for driving the image pickup device 322.

Subject light coming in via the variable-focus lens 1 and the shutter unit 321 enters the image pickup device 322. The image pickup device 322 converts the subject light into an electrical signal, i. e. , an analog image signal, and outputs this signal to the analog signal processing section 323.

The analog signal processing section 323 performs processing including noise reduction processing on the analog image signal output from the image pickup device 322, and outputs the processed analog image signal to the A/D section 326. The A/D section 326 performs A/D (analog/digital) conversion processing on the analog image signal and outputs a digital image signal obtained by the conversion processing.

The digital camera 300 also has a digital signal processing section 327, a temporary memory 328, a compression/expansion section 329, an internal memory (or a memory card) 330 and the above-mentioned image monitor 319. The digital image signal converted by A/D conversion processing in the A/D section 326 is input to the digital signal processing section 327. The digital signal processing section 327 performs predetermined digital signal processing on the input digital image signal to complete image data representing the subject image of the present imaged scene, and temporarily stores the image data in the temporary memory 328. The data stored in the temporary memory 328 is compressed by the compression/expansion section 329 and is thereafter recorded in the internal memory (or memory card) 330. In some image taking mode, the data may be directly recoded in the internal memory 330 without undergoing the compression step. The data stored in the temporary memory 328 is read out to the image monitor 319 to enable the subject image to be displayed oh the image monitor 319.

The digital camera 300 further has an operating switch section 331 including the above-mentioned menu switch 317 and the execution/view change switch 318, and the shutter button 314. In an image taking operation, the operating switch section 331 is operated to set the system in a desired image taking condition, and the shutter button 314 is depressed.

Figure 39:
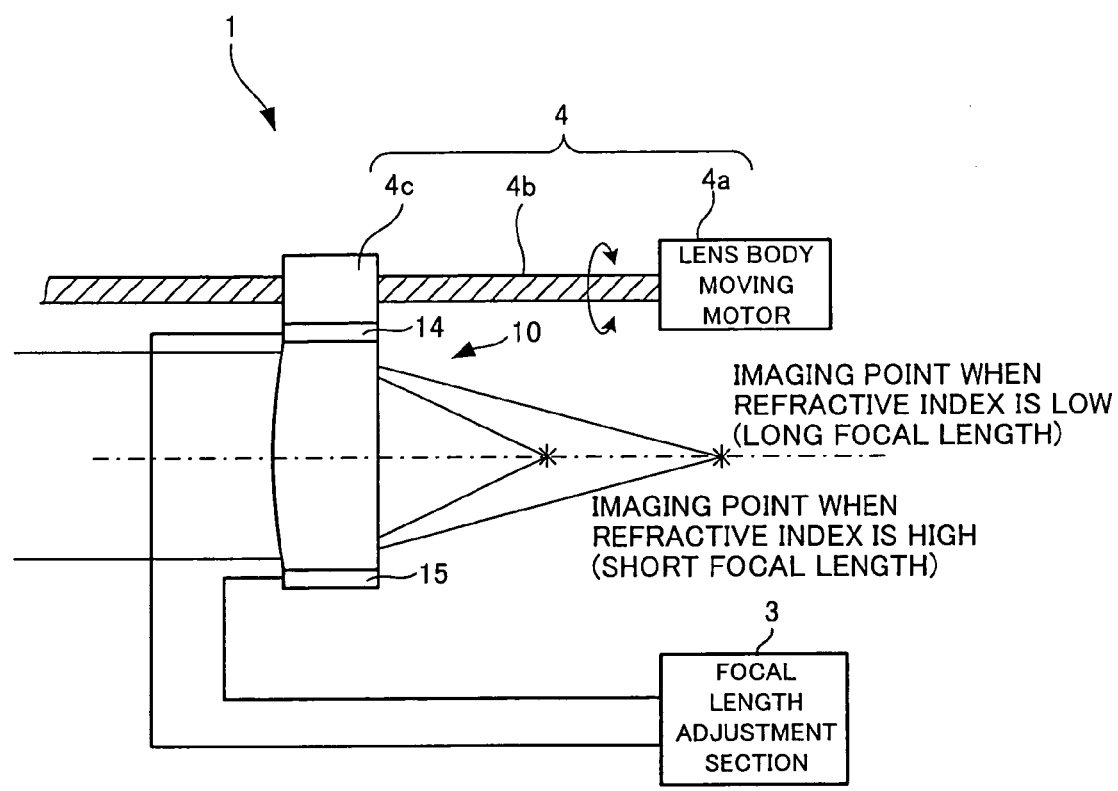
FIG. 39 is a diagram showing imaging points of the lens body constituting a variable-focus lens.
Figure 40:
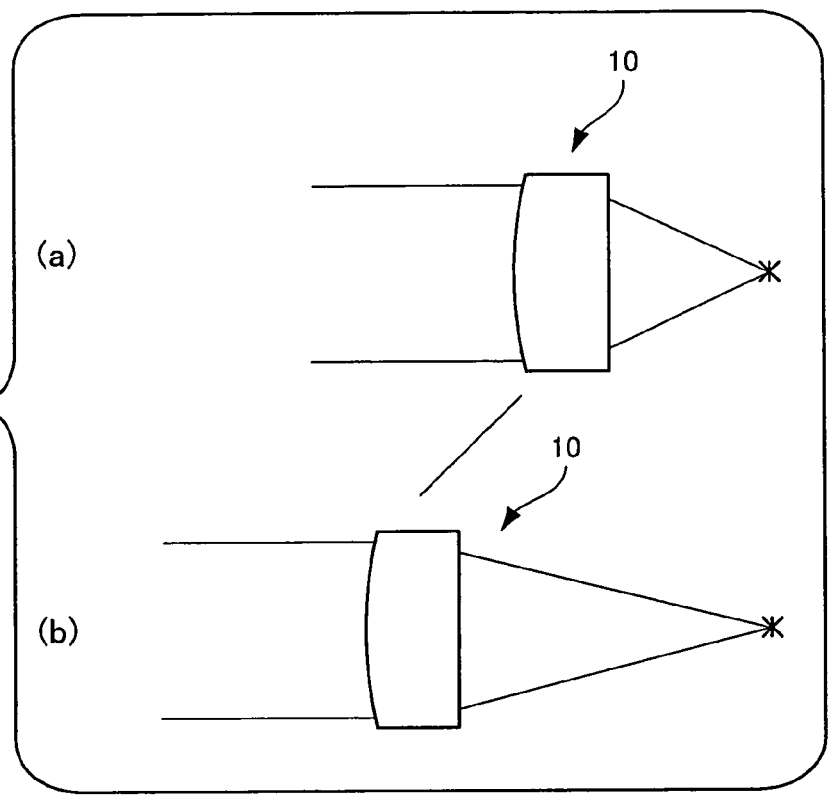
FIG. 40 is a diagram showing an imaging point when the lens body is moved to a wide-angle position, and an imaging point when the lens body is moved to a telephoto position.

FIG. 39 is a diagram showing imaging points of the lens body constituting the variable-focus lens shown in FIG. 38. FIG. 40 is a diagram showing an imaging point when the lens body shown in FIG. 39 is moved to a wide-angle position, and an imaging point when the lens body is moved to a telephoto position.

FIG. 39 schematically illustrates the variable-focus lens 1 having the lens body 10, the focal length adjustment section 3 and the moving mechanism 4. The moving mechanism 4 is provided with the lens body moving motor 4a, a feed screw 4b, and a member 4c mounted on the lens body 10. The feed screw 4b is rotatably supported and moves in the optical axis direction with the normal/reverse rotation of the motor 4a. The lens body 10 is moved in the optical axis direction by the feed screw 4b through the member 4c. The lens body 10 has an imaging point corresponding to a high refractive index (short focal length) when it is controlled by the focal length adjustment section 3 so that the amount of refraction of light is increased, and has an imaging point corresponding to a low refractive index (long focal length) when it is controlled so that the amount of reaction of light is reduced. In the case of control at a wide-angle position shown in part (a) of FIG. 40, the lens body 10 is controlled by the focal length adjustment section 3 so that the refraction of light is increased, and also controlled by the moving mechanism 4 so as to be brought closer to the imaging point. In the case of control at a telephoto position shown in part (b) of FIG. 40, the lens body 10 is controlled by the focal length adjustment section 3 so that the refraction of light is reduced, and also controlled by the moving mechanism 4 so as to be moved way from the imaging point. In this way, the focal length is adjusted between the telephoto end and the wide-angle end by changing the focal length of the lens body 10, thereby setting a desired image-taking field angle. Also, the lens body 10 is moved forward and backward in the optical axis direction to perform focusing. Thus, a zooming function and a focusing function can be realized by using one lens body 10. Therefore, the variable-focus lens can be made simpler in structure and smaller in size.

A variable-focus lens capable of changing the focal length in eight steps for example may be provided in a digital camera to suitably perform automatic focusing.

Figure 41:
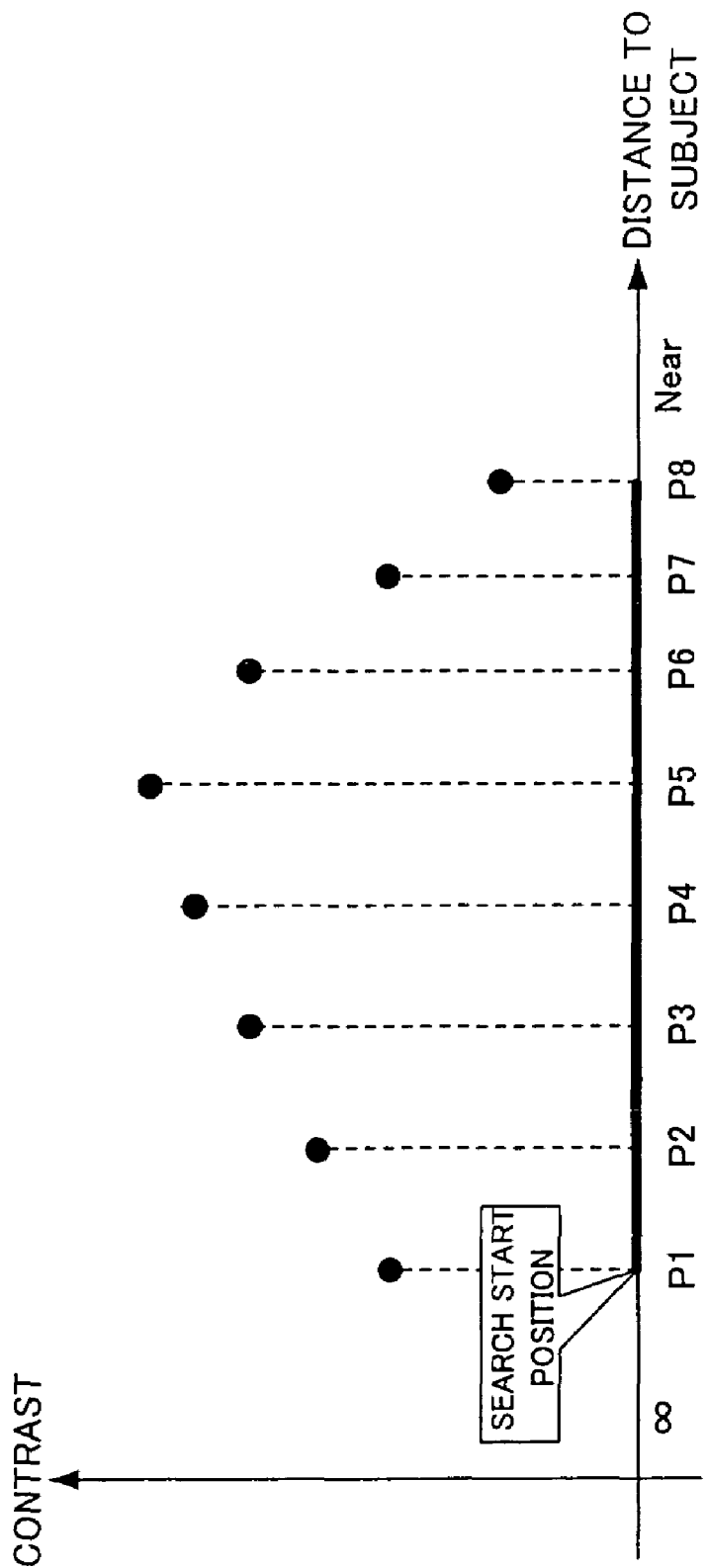
FIG. 41 is a diagram showing a state in which automatic focusing is performed by using a variable-focus lens capable of changing the focal length in eight steps.

FIG. 41 is a diagram showing a state in which automatic focusing is performed by using a variable-focus lens capable of changing the focal length in eight steps.

Automatic focusing based on a so-called "mountain-climbing method" can be performed by using as a focusing lens a focal-length-variable lens body whose focal length is changed in eight steps according to a-positive refractive index determined by a dispersion medium and the amount of movement of nanoparticles in a light passage region caused by electrophoresis, as described below.

The abscissa of FIG. 41 represents the subject distance and the ordinate represents contrast. Refractive indexes P1, P2, P3, P4, P5, P6, P7, and P8 of the lens body constituting the variable-focus lens are shown on the abscissa of FIG. 41 in correspondence with subject distances from a long distance to a short distance. The refractive indexes P1, P2, P3, P4, P5, P6, P7, and P8 are in increasing order from P1 to P8.

A maximum-contrast point is obtained by changing the refractive index of the lens body and checking the direction of change in contrast, and an in-focus point is obtained by assuming that a subject to be focused at the maximum point exists. Thus, focusing is performed by obtaining an in-focus point by performing an automatic focusing search using a variable-focus lens whose focal length is changed in eight steps. In this case, there is no need for a drive mechanism such as a-motor in contrast with the conventional technique of performing focusing by moving the focusing lens in the optical axis direction. Consequently, an image taking lens having a simplified structure, a reduced size and improved impact resistance can be implemented.

While applications of the embodiments of the image taking apparatus in accordance with the present invention to a digital camera have been described by way of example, the image taking apparatus of the present invention may also be applied to a silver-salt camera, a portable telephone, and other devices.

What is claimed is:

1. A variable-focus lens comprising:
   a lens body having a container which is light-transmissive at least in a light passage region, and which has the shape of a lens, a light-transmissive dispersion medium enclosed in the container, a light-transmissive dispersoid dispersed in the dispersion medium and having a refractive index different from the refractive index of the dispersion medium, and an electromagnetic field generator which changes the focal length of the light passage region by moving the dispersoid dispersed in the dispersion medium by an electromagnetic force;
   a moving mechanism which moves the lens body in an optical axis direction; and
   a focal length adjustment section which changes the focal length of the light passage region by controlling an electromagnetic field generated by the electromagnetic field generator.

2. The variable-focus lens according to claim 1, wherein the electromagnetic field generator comprises an electrode which receives application of a voltage to cause electrophoresis of the dispersoid, and
   the focal length adjustment section controls the voltage applied to the electrode.

3. The variable-focus lens according to claim 2, wherein the dispersoid comprises titanium oxide.

4. The variable-focus lens according to claim 2, wherein the dispersoid comprises alumina.

5. The variable-focus lens according to claim 2, wherein the dispersion medium is an organic dispersion medium.

6. The variable-focus lens according to claim 2, wherein the dispersion medium is a hydrocarbon-based organic dispersion medium.

7. The variable-focus lens according to claim 2, wherein an inner surface of the electrode is coated with an insulating film which is placed adjacent to the dispersion medium.

8. The variable-focus lens according to claim 7, wherein the insulating film is a polyimide insulating film.

9. The variable-focus lens according to claim 1, wherein the dispersoid is magnetic,
   the electromagnetic field generator is a magnetic field generator which causes magnetophoresis of the dispersoid, and
   the focal length adjustment section controls a magnetic field generated by the magnetic field generator.

10. The variable-focus lens according to claim 9, wherein the dispersoid comprises titanium-cobalt oxide.

11. The variable-focus lens according to claim 1, wherein the dispersoid is nanoparticles.

12. The variable-focus lens according to claim 11, wherein the dispersoid is nanoparticles having a particle size of 5 to 100 nm.

13. The variable-focus lens according to claim 1, wherein the dispersion medium is water.

14. The variable-focus lens according to claim 1, wherein at least the light passage region in the container has the shape of a lens with a positive refractive power.

15. The variable-focus lens according to claim 1, wherein at least the light passage region in the container has the shape of a lens with a negative refractive power.

16. The variable-focus lens according to claim 1, wherein at least the light passage region in the container has the shape of an aspheric lens.

17. An image taking apparatus comprising:
   an image taking lens which includes the variable-focus lens according to claim 1, and which performs focal length adjustment and focusing with the variable-focus lens,
   wherein an image signal is generated by performing an image taking operation including capturing subject light which enters the image taking apparatus through the image taking lens.

* * * * *